(12) United States Patent
Yang et al.

(10) Patent No.: US 12,526,357 B2
(45) Date of Patent: Jan. 13, 2026

(54) ELECTRONIC DEVICE UTILIZING A REINFORCING PLATE

(71) Applicant: Honor Device Co., Ltd., Shenzhen (CN)

(72) Inventors: Xiujuan Yang, Shenzhen (CN); Mingchuan Li, Shenzhen (CN); Wenhao Wang, Shenzhen (CN)

(73) Assignee: HONOR DEVICE CO., LTD., Shenzhen (CN)

(*) Notice: Subject to any disclaimer, the term of this patent is extended or adjusted under 35 U.S.C. 154(b) by 488 days.

(21) Appl. No.: 18/028,086

(22) PCT Filed: Aug. 30, 2022

(86) PCT No.: PCT/CN2022/115773
§ 371 (c)(1),
(2) Date: Mar. 23, 2023

(87) PCT Pub. No.: WO2023/065831
PCT Pub. Date: Apr. 27, 2023

(65) Prior Publication Data
US 2024/0314234 A1   Sep. 19, 2024

(30) Foreign Application Priority Data

Oct. 20, 2021   (CN) .......................... 202111219235.6

(51) Int. Cl.
*H04M 1/00* (2006.01)
*H04M 1/02* (2006.01)
(52) U.S. Cl.
CPC ......... *H04M 1/0277* (2013.01); *H04M 1/022* (2013.01)

(58) Field of Classification Search
CPC .... H04M 1/0277; H04M 1/022; H04M 1/185; H04M 1/0268; H04M 1/0216;
(Continued)

(56) References Cited

U.S. PATENT DOCUMENTS

2018/0324964 A1   11/2018  Yoo et al.
2019/0036068 A1*  1/2019   Kim ................. H05K 1/147
(Continued)

FOREIGN PATENT DOCUMENTS

CN    102480832 A    5/2012
CN    107250953 A    10/2017
(Continued)

*Primary Examiner* — Pakee Fang
(74) *Attorney, Agent, or Firm* — Slater Matsil, LLP

(57) ABSTRACT

An electronic device includes a first body, a second body, a middle cover, and a flexible printed circuit. The flexible printed circuit includes a through-shaft section, a reinforcing plate is provided on a surface of the through-shaft section, the reinforcing plate includes a support sheet and a flexible region, and the support sheet is stacked on and fastened to a surface of the through-shaft section. The flexible region is provided on the support sheet or divides the support sheet into a plurality of sheet bodies. The first body and the second body are rotatably connected to two opposite sides of the middle cover, respectively. The flexible printed circuit extends from the first body to the second body, to connect the first body and the second body, and the reinforcing plate is located in the middle cover and is fastened to the middle cover.

15 Claims, 11 Drawing Sheets

(58) Field of Classification Search
CPC .... G06F 1/1616; G06F 1/1652; G06F 1/1658; G06F 1/1681; G06F 1/1683; H05K 1/028; H05K 1/147; H05K 1/189; H05K 1/02
See application file for complete search history.

(56) References Cited

U.S. PATENT DOCUMENTS

| | | |
|---|---|---|
| 2021/0116959 A1 | 4/2021 | Heo et al. |
| 2021/0181808 A1 | 6/2021 | Liao et al. |
| 2022/0035410 A1* | 2/2022 | Lee ........................ G06F 1/1681 |
| 2022/0291720 A1* | 9/2022 | Luo ........................ G06F 1/1683 |
| 2022/0321683 A1* | 10/2022 | Luo ..................... H04M 1/0268 |
| 2023/0018137 A1 | 1/2023 | Yuan et al. |
| 2023/0040036 A1* | 2/2023 | Lee ........................... G06F 1/16 |
| 2023/0096714 A1* | 3/2023 | Bae ..................... H05K 1/0393 |
| | | 361/679.27 |

FOREIGN PATENT DOCUMENTS

| | | |
|---|---|---|
| CN | 206558780 U | 10/2017 |
| CN | 110445913 A | 11/2019 |
| CN | 212850572 U | 3/2021 |
| CN | 213753122 U | 7/2021 |
| WO | 2020259443 A1 | 12/2020 |
| WO | 2021007811 A1 | 1/2021 |
| WO | 2021103907 A1 | 6/2021 |
| WO | 2021196832 A1 | 10/2021 |

* cited by examiner

ELECTRONIC DEVICE UTILIZING A REINFORCING PLATE

CROSS-REFERENCE TO RELATED APPLICATIONS

This application is a National Stage of International Application No. PCT/CN2022/115773 filed on Aug. 30, 2022, which claims priority to Chinese Patent Application No. 202111219235.6 filed on Oct. 20, 2021, both of which are incorporated herein by reference in their entireties.

TECHNICAL FIELD

This application relates to the technical field of foldable communication devices, in particular, to an electronic device.

BACKGROUND

With development of science and technology, various electronic devices gradually become an indispensable part of life. For example, a mobile phone is provided with an increasingly large display to improve user experience and increase use functions of the mobile phone. To increase a display area of the mobile phone while reducing a volume of the mobile phone, a foldable mobile phone emerges.

In an existing foldable mobile phone, a display is supported by two bodies that are rotatably connected by using a folding structure, and the display can be unfolded or folded in a relative manner by using the two bodies, to implement unfolded and folded states of the display. The two bodies are provided with different circuit modules. To implement electrical connection and communication between the two circuit modules in the two bodies, the existing foldable mobile phone is provided with a flexible printed circuit (flexible print circuit, FPC), and the two circuit modules are electrically connected by using the flexible printed circuit. However, if the flexible printed circuit becomes faulty during subsequent use and needs to be replaced, the display and the bodies need be disassembled, which is inconvenient for repair and replacement.

SUMMARY

This application provides an electronic device, to resolve a technical problem that repair is inconvenient because a whole device needs to be disassembled when a flexible printed circuit is replaced.

An electronic device provided in an embodiment of this application includes a first body, a second body, a rotating shaft portion, a display, a middle cover, and a flexible printed circuit.

The first body is connected to one side of the middle cover by using the rotating shaft portion, the second body is connected to the other side of the middle cover by using the rotating shaft portion, the display is connected to the first body and the second body, and the electronic device includes a gap connecting the first body, the second body, and the middle cover. The rotating shaft portion makes both the first body and the second body rotatable. The display is specifically a flexible display that can be deformed and bent. The first body and the second body may be unfolded or folded relative to each other. When the first body and the second body are unfolded relative to each other, the display is in an unfolded state, and a display area is large. When the first body and the second body are folded relative to each other, the display is in a folded state.

The flexible printed circuit is located in the gap and extends from the first body to the second body, to connect the first body and the second body. The first body includes a first functional module, the second body includes a second functional module, and the flexible printed circuit is specifically connected to the first functional module and the second functional module, so that the first functional module and the second functional module are electrically connected.

The flexible printed circuit includes a through-shaft section, and a reinforcing plate is provided on a surface of the through-shaft section. The reinforcing plate can increase strength of the through-shaft section, to prevent a through-shaft portion from being damaged or broken during repeated unfolding and folding of the electronic device.

The reinforcing plate is located in the middle cover, the reinforcing plate includes a support sheet and a flexible region, and a surface of the support sheet that faces away from the through-shaft section is fastened to the middle cover. The flexible region is provided on the support sheet or divides the support sheet into a plurality of sheet bodies, and the support sheet or the sheet body is stacked on and fastened to a surface of the through-shaft section. The reinforcing plate is fastened to the middle cover by using the support sheet, the flexible region is not connected to the middle cover, and there is no fastening force between the flexible region and the middle cover.

In this embodiment, the reinforcing plate includes the support sheet and the flexible region. Because there is no fastening force between the flexible region and the middle cover, a fastening force between the reinforcing plate and the middle cover in this embodiment is significantly less than that caused by a reinforcing plate with a same area. A fastening force to be overcome during replacement of the flexible printed circuit is small. The flexible region further enables the reinforcing plate to be flexibly deformed when the flexible printed circuit is moved. Specifically, the flexible region of the reinforcing plate enables the reinforcing plate to be deformed and bent in at least a length direction of the electronic device. Therefore, when the flexible printed circuit is disassembled, the fastening force between the reinforcing plate and the middle cover is dispersed into a plurality of small portions as the reinforcing plate is bent and deformed. In this way, the flexible printed circuit can be withdrawn and replaced without disassembling the display and the body structures, thereby improving convenience in repairing and replacing the flexible printed circuit. As the flexible printed circuit can be replaced without disassembling the display and the body structures, damage to the display or a middle frame occurring during replacement of the flexible printed circuit can be avoided, thereby prolonging a lifetime of the electronic device.

In an embodiment, the reinforcing plate is adhesively fastened to the middle cover. Specifically, the support sheet is adhesively fastened to the middle cover. During mounting, adhesive is dispensed on a surface of the support sheet that faces away from the through-shaft portion. When the flexible printed circuit is mounted in the electronic device, an adhesive-dispensing portion is in contact with the middle cover to fasten the flexible printed circuit. The adhesive fastening manner has high reliability, and can prevent the whole flexible printed circuit from being displaced due to loosening of the through-shaft portion, and avoid instable electrical connection between the first body and the second body that is caused by the displacement of the flexible printed circuit, thereby improving stability of the electrical connection.

In an embodiment, the reinforcing plate has a magnetic surface, the middle cover has a magnetic surface, and the reinforcing plate and the middle cover are fastened by magnetic attraction. Specifically, the reinforcing plate may be prepared by using a material that can be attracted by a magnetic member, for example, prepared by using steel, and a surface of the reinforcing plate that faces the middle cover is a magnetic surface. A layer of magnet is provided on the middle cover, and a surface of the magnet that faces the reinforcing plate is the magnetic surface of the middle cover. The magnet can generate an attraction force on the reinforcing plate prepared by using steel, to fasten the through-shaft section of the flexible printed circuit.

In an embodiment, the reinforcing plate is fastened in the middle cover by using a fastening block, the fastening block is magnetic and fastened in the middle cover, and the reinforcing plate is magnetically connected to the fastening block. Specifically, the fastening block is a magnet, the reinforcing plate is prepared by using steel, the reinforcing plate has a first reinforcing surface and a second reinforcing surface opposite to the first reinforcing surface, the fastening block includes a first fastening surface and a second fastening surface opposite to the first fastening surface, a magnetic pole of the first fastening surface is an N pole, and a magnetic pole of the second fastening surface is an S pole. The first reinforcing surface is adhesively fastened to the through-shaft section of the flexible printed circuit, so that the reinforcing plate is fastened to the flexible printed circuit, the second reinforcing surface is magnetically fastened to the first fastening surface, and the second fastening surface is fastened to the middle cover by attraction.

The reinforcing plate is fastened by using the magnet. This not only can ensure reliable connection between the through-shaft section of the flexible printed circuit and the middle cover, but also can improve convenience in disassembling the flexible printed circuit and reduce disassembly difficulty in withdrawing the flexible printed circuit when the electronic device is not disassembled. Specifically, when the flexible printed circuit needs to be disassembled, an N pole of a magnet is made to approach the display of the electronic device. In this case, a repulsion force is generated between the magnet and the N pole of the fastening block, so that an attraction force imposed by the fastening block on the reinforcing plate is weakened. After the attraction force is weakened, the flexible printed circuit can be more easily withdrawn from the electronic device.

In an embodiment, the support sheet includes a plurality of individual sheet bodies, and the flexible region is formed when the sheet bodies are mounted on the flexible printed circuit. Specifically, when the plurality of sheet bodies are mounted on the flexible printed circuit, the sheet bodies are spaced, and a spacing between every two adjacent sheet bodies form the flexible region. Because two adjacent sheet bodies are totally isolated, the flexible region formed can make the reinforcing plate have a very strong flexible deformation capability. When the flexible printed circuit is withdrawn, the fastening force for fastening the reinforcing plate is effectively dispersed, and this can reduce difficulty in disassembling the flexible printed circuit.

In an embodiment, the support sheet includes two individual sheet bodies. The two individual sheet bodies are spaced on the through-shaft section of the flexible printed circuit along a width direction of the electronic device. In this case, a spacing extending in the length direction of the electronic device is formed between the two sheet bodies, and this spacing forms the flexible region. A reinforcing plate including two individual sheet bodies is easy to mount.

In an embodiment, the flexible region is a hollow region running through the support sheet. In this case, the support sheet maintains an integral state. This can simplify a step of mounting the reinforcing plate onto the through-shaft section of the flexible printed circuit, improve assembly convenience, and enable the reinforcing plate to have a flexible deformation capability.

In an embodiment, there are a plurality of hollow regions, and the plurality of hollow regions are regularly arranged on the support sheet. Specifically, the plurality of hollow regions may be regularly arranged on the support sheet in M rows and N columns, where both M and N are positive integers greater than or equal to 1. The plurality of hollow regions are regularly arranged, so that structural strength at each location of the reinforcing plate is uniform and a service life of the reinforcing plate can be prolonged.

In an embodiment, the plurality of hollow regions are randomly arranged.

In an embodiment, the support sheet includes a plurality of sheet bodies, the flexible region is a film layer formed by a flexible material, and every adjacent two of the sheet bodies are connected by using the film layer. When the flexible region is provided as a film layer, the reinforcing plate becomes a whole. This can facilitate mounting of the reinforcing plate and the flexible printed circuit.

In an embodiment, the support sheet is provided with a hollow region, the hollow region is provided with a film layer formed by a flexible material, and the film layer forms the flexible region. The flexible region formed by the film layer enables the reinforcing plate to have a good flexible deformation capability, thereby facilitating disassembly of the flexible printed circuit.

In an embodiment, the middle cover includes a support groove and an appearance surface that faces away from the support groove, and the fastening block is provided in the support groove and is fixedly connected to a bottom wall of the support groove. When the first body and the second body are folded relative to each other, the appearance surface is exposed, is in a visible state, and serves as an appearance of the electronic device. When the first body and the second body are unfolded relative to each other, the appearance surface is at least partially blocked. The support groove is provided to accommodate the fastening block in the support groove. This can save space and make a structure of the electronic device more compact.

In an embodiment, the first body and the second body form an accommodating cavity, the flexible printed circuit further includes a first connecting section and a second connecting section that are located outside the accommodating cavity, and the first connecting section and the second connecting section are located at two opposite ends of the flexible printed circuit; and the through-shaft section is located between the first connecting section and the second connecting section, and the through-shaft section is located in the accommodating cavity. The first body includes a first bearing plate and a first circuit board that are located outside the accommodating cavity, and the second body includes a second bearing plate and a second circuit board that are located outside the accommodating cavity; and the first circuit board is stacked on the first bearing plate, the second circuit board is stacked on the second bearing plate, and the first connecting section and the second connecting section are electrically connected to the first circuit board and the second circuit board, respectively.

The accommodating cavity is configured to accommodate components such as the through-shaft section of the flexible printed circuit, the middle cover, and the fastening block, and can protect the components such as the through-shaft section of the flexible printed circuit and the fastening block.

Specifically, the first body includes a first housing and the first circuit board, the first housing includes a first middle frame and a first support plate, the first middle frame and the first support plate form a first accommodating cavity and a first groove that can communicate with each other, and a surface of the first support plate that faces away from the first middle frame supports the display. The second body includes a second housing and the second circuit board, the second housing includes a second middle frame and a second support plate, the second middle frame and the second support plate form a second accommodating cavity and a second groove that can communicate with each other, a surface of the second support plate that faces away from the second middle frame supports the display, and the first groove and the second groove are opposite to and can communicate with each other. The first accommodating cavity, the first groove, the second accommodating cavity, and the second groove form the accommodating cavity. The middle cover is mounted in the first groove and the second groove.

The flexible printed circuit further includes a first extending section and a second extending section, the first connecting section, the first extending section, the through-shaft section, the second extending section, and the second connecting section are sequentially connected in an X-axis direction. The first extending section is located in the first accommodating cavity and the second extending section is located in the second accommodating cavity. The first extending section and the second extending section have a capability of free deformation and bending. In a process in which the electronic device is unfolded or folded, the first extending section and the second extending section can be bent or unbent accordingly, to adapt to unfolding and folding of the electronic device and prevent the through-shaft section from falling off during unfolding and folding of the electronic device.

In an embodiment, the first bearing plate is provided with a first accommodating groove, the second bearing plate is provided with a second accommodating groove, the first circuit board and the first connecting section are located in the first accommodating groove, and the second circuit board and the second connecting section are located in the second accommodating groove. This can save space and make the structure of the electronic device more compact.

In an embodiment, the first circuit board is soldered and fastened to the first connecting section by using a first edge connector, and the second circuit board is soldered and fastened to the second connecting section by using a second edge connector. This implements an electrical connection between the first circuit board and the flexible printed circuit, and implements an electrical connection between the second circuit board and the flexible printed circuit, so that the first body and the second body can perform communication with each other. Compared with a conventional fastening manner based on board-to-board clipping, a thickness of a connection joint between the first circuit board and the flexible printed circuit and a thickness of a connection joint between the second circuit board and the flexible printed circuit are greatly reduced. When a height of a mounting region, between the first support plate and the first bearing plate, that is used for mounting the flexible printed circuit and a height of a mounting region, between the second support plate and the second bearing plate, that is used for mounting the flexible printed circuit are unchanged, as a total thickness resulted from the connection between the first circuit board and the first connecting section is reduced and a total thickness resulted from the connection between the second circuit board and the second connecting section is reduced, during disassembly and re-mounting of the flexible printed circuit, a distance in a height space reserved for the flexible printed circuit to pass through is increased, and convenience in disassembling and mounting the flexible printed circuit is improved.

As the total thickness resulted from the connection between the first circuit board and the first connecting section is greatly reduced, and the total thickness resulted from the connection between the second circuit board and the second connecting section is greatly reduced, it is ensured that the flexible printed circuit can pass between the first support plate and the first bearing plate and pass between the second support plate and the second bearing plate, and further a thickness of the electronic device can be properly reduced, thereby improving structural compactness of the electronic device.

In an embodiment, the first bearing plate includes a first bearing surface and a second bearing surface opposite to the first bearing surface; and the second bearing plate includes a third bearing surface and a fourth bearing surface opposite to the third bearing surface; and the first circuit board is stacked on the first bearing surface or the second bearing surface, and the second circuit board is stacked on the third bearing surface or the fourth bearing surface. Therefore, flexibility of providing an internal structure is improved, and a design scheme can be adaptively selected based on different models.

In an embodiment, a first gap is provided between the first middle frame and the first support plate, a second gap is provided between the second middle frame and the second support plate, a part of the first connecting section is located in the first gap, and a part of the second connecting section is located in the second gap; and heights of both the first gap and the second gap are greater than a thickness of the flexible printed circuit. During disassembly and mounting of the flexible printed circuit, the flexible printed circuit needs to pass through both the first gap and the second gap. Setting the heights of the first gap and the second gap to be greater than the thickness of the flexible printed circuit can facilitate the disassembly and mounting of the flexible printed circuit.

Specifically, during disassembly of the flexible printed circuit, when a battery rear cover is removed, at least parts of the first connecting section and the second connecting section can be viewed. In an example of operating the first connecting section, remaining parts of the flexible printed circuit sequentially pass through the second gap, the accommodating cavity, and the first gap, and the flexible printed circuit is finally completely withdrawn. When another flexible printed circuit is mounted onto the electronic device, the first connecting section of the original flexible printed circuit sequentially passes through the second gap, the accommodating cavity, and the first gap, and finally extends out of the accommodating cavity, to implement the mounting of the another flexible printed circuit.

In an embodiment, the electronic device further includes a press-fit plate, the press-fit plate is fixedly connected to the middle cover, the press-fit plate has a press-fit surface, and the press-fit surface faces a surface of the through-shaft section that faces away from the support sheet; and in a thickness direction of the electronic device, there is a spacing between the press-fit surface and the surface of the through-shaft section that faces away from the support sheet. In a use process of the mobile phone, repeated unfolding and folding cause the through-shaft section to be bent and deformed along with the unfolding and folding of the mobile phone. During repeated bending and deformation of the through-shaft section, the press-fit plate can prevent forming a wrinkle part that is difficult to unfold, so as to ensure that the flexible printed circuit is not broken due to a produced wrinkle, thereby prolonging a service life of the flexible printed circuit.

There is a proper spacing between the press-fit surface and a surface of the through-shaft section that faces away from the reinforcing plate. This can facilitate withdrawal of the flexible printed circuit without causing an excessively large thickness of the mobile phone. The spacing is from 1.3 to 1.7 millimeters, which not only can ensure shaping of the through-shaft section by the press-fit surface and prevent the through-shaft section from producing a wrinkle, but also can keep the structure of the electronic device compact.

DETAILED DESCRIPTION OF ILLUSTRATIVE EMBODIMENTS

The following describes the embodiments of this application with reference to the accompanying drawings in the embodiments of this application.

Figure 1:
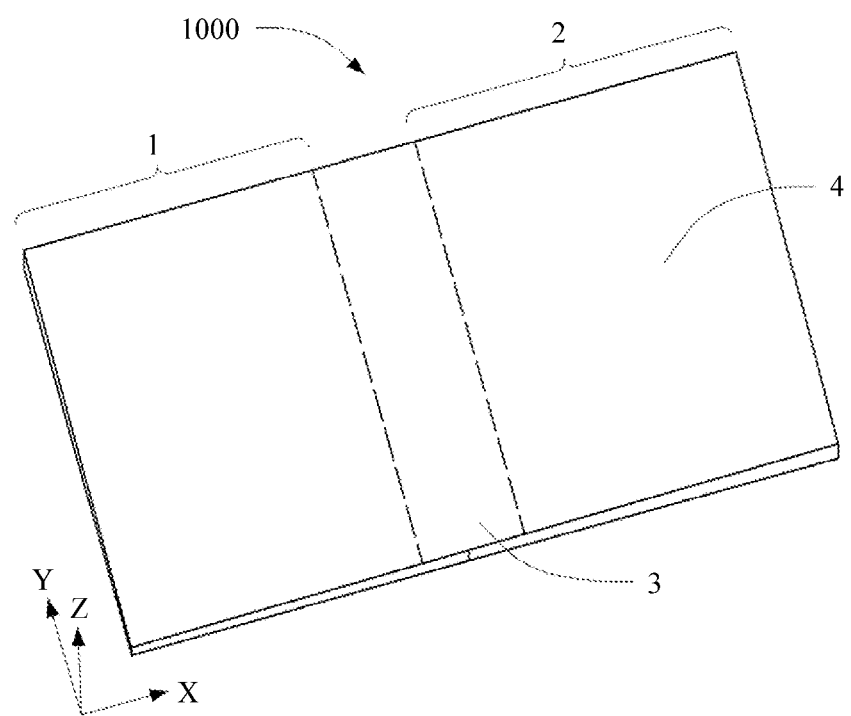
FIG. 1 is a schematic diagram of a structure of an electronic device in a state according to an embodiment of this application.
Figure 2:
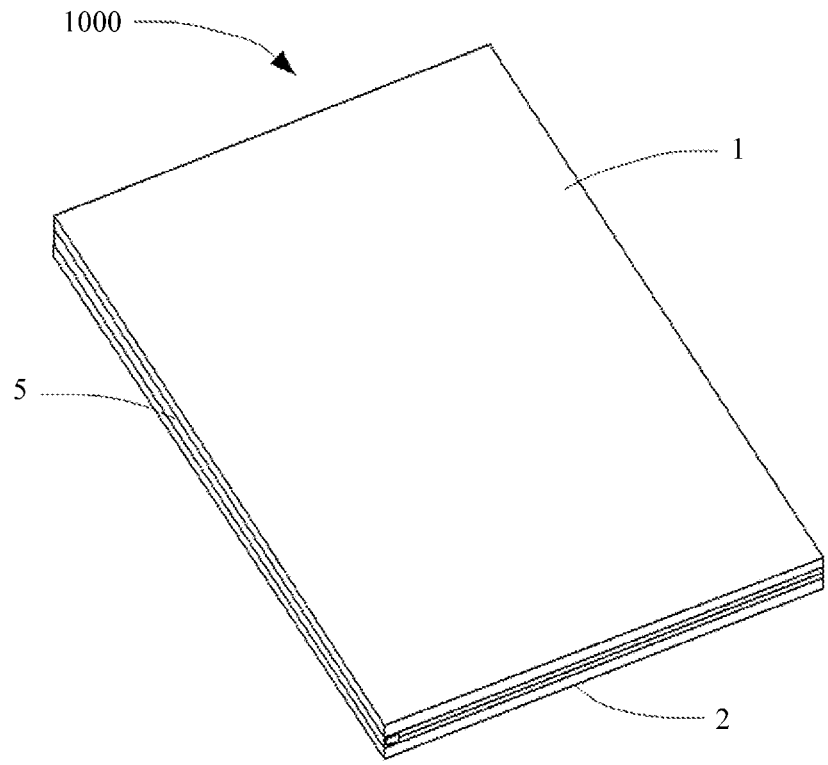
FIG. 2 is a schematic diagram of a structure of the electronic device shown in FIG. 1 that is in a folded state.

FIG. 1 is a schematic diagram of a structure of an electronic device in a state according to an embodiment of this application. FIG. 2 is a schematic diagram of a structure of the electronic device shown in FIG. 1 that is in a folded state. The electronic device 1000 shown in FIG. 1 is in an unfolded state.

For ease of description, a width direction of the electronic device 1000 is defined as an X-axis direction, a length direction of the electronic device 1000 is defined as a Y-axis direction, and a thickness direction of the electronic device 1000 is defined as a Z-axis direction. Every two of the X-axis direction, the Y-axis direction, and the Z-axis direction are perpendicular to each other. The electronic device 1000 may be an electronic product such as a mobile phone, a tablet computer, a personal digital assistant (personal digital assistant, PDA), a learning machine, a game console, or a notebook computer.

Figure 3:
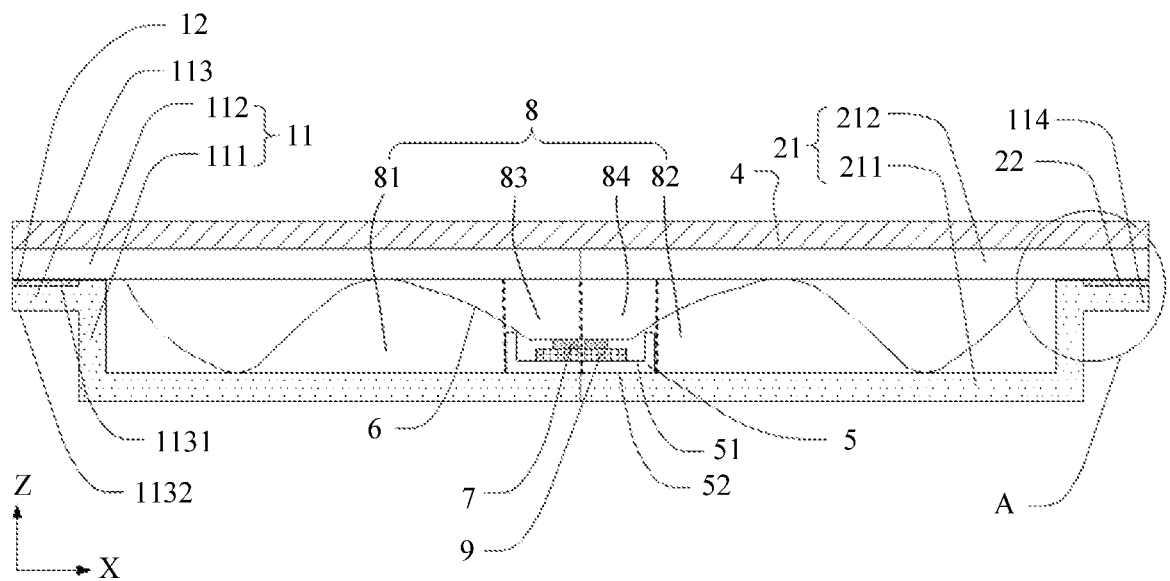
FIG. 3 is a schematic diagram of a planar structure of the electronic device shown in FIG. 1.

In this embodiment of this application, description is provided by using an example in which the electronic device 1000 is a mobile phone. The mobile phone includes a first body 1, a second body 2, a rotating shaft portion 3, a display 4, a middle cover 5, and a flexible printed circuit 6 (FIG. 3 is a simplified schematic diagram of a planar structure of the electronic device shown in FIG. 1, and a specific connection status of the rotating shaft portion 3 is not shown in the figure). The first body 1 and the second body 2 are separately connected to the middle cover 5 by using the rotating shaft portion 3, and the first body 1 and the second body 2 may be unfolded or folded relative to each other by using the rotating shaft portion 3. A reinforcing plate 7 is fastened to a through-shaft portion of the flexible printed circuit 6, and the reinforcing plate 7 is fixedly connected to the middle cover 5, to fasten the through-shaft portion of the flexible printed circuit 6.

The display 4 is connected to the first body 1 and the second body 2. When the first body 1 and the second body 2 are unfolded relative to each other, the first body 1 and the second body 2 are distributed side by side in the X-axis direction. An included angle between the first body 1 and the second body 2 is 180 degrees. The display 4 is in an unfolded state, and the middle cover 5 is blocked by the first body 1 and the second body 2. When the first body 1 and the second body 2 are folded relative to each other, the first body 1 and the second body 2 are stacked and distributed in the Z-axis direction. An included angle between the first body 1 and the second body 2 is 0 degrees. The display 4 is in a folded state. A part of the middle cover 5 is exposed, and the middle cover 5 is located between the first body 1 and the second body 2 and serves as an appearance member of the mobile phone. For the included angles between the first body 1 and the second body 2 being 180 degrees and 0 degrees, values in a tolerance angle range are allowed in assembly. For example, 179 degrees may be understood as 180 degrees, and 1 degree may be understood as 0 degrees.

The first body 1 and the second body 2 jointly form an accommodating cavity 8. The through-shaft portion and a deformable portion of the flexible printed circuit 6 are located in the accommodating cavity 8. The middle cover 5 is located between the first body 1 and the second body 2, and the middle cover 5 is partially or completely located in the accommodating cavity 8. The flexible printed circuit 6 connects the first body 1 and the second body 2, so that the first body 1 and the second body 2 perform communication with each other.

Figure 5:
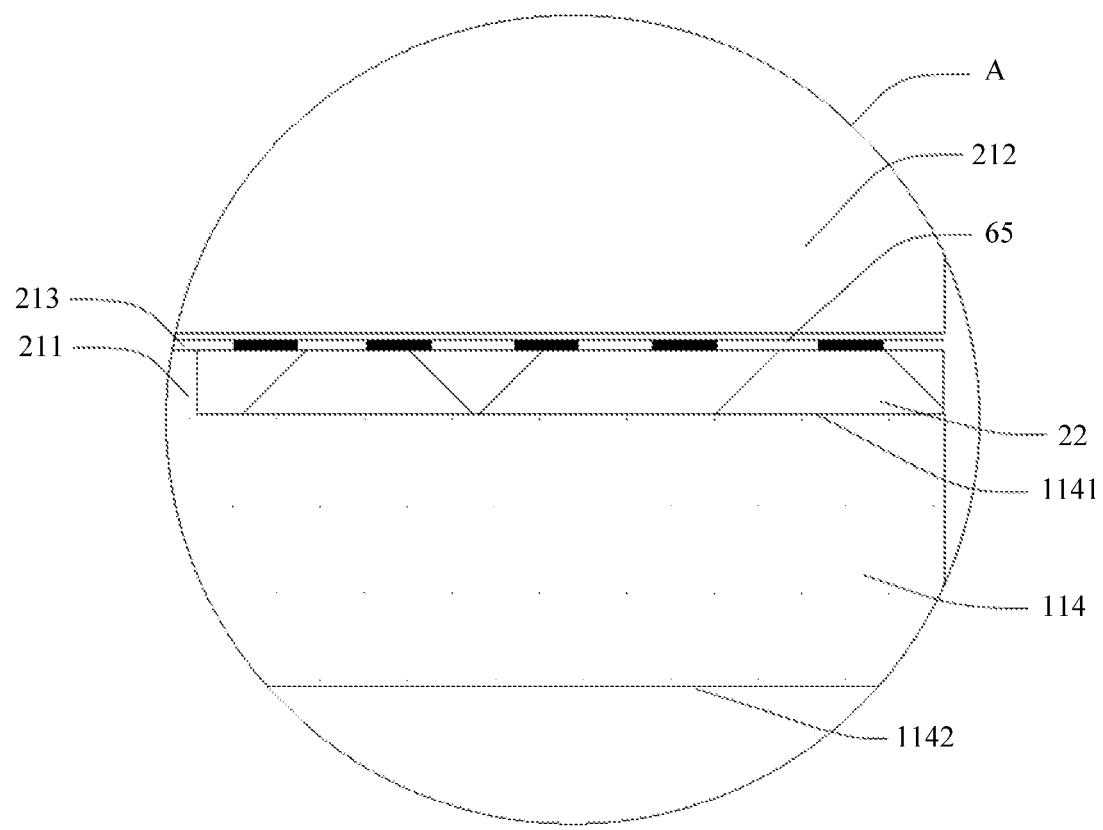
FIG. 5 is an enlarged view of a location A in FIG. 3.

In this embodiment, the first body 1 includes a first housing 11 and a first functional module (not labeled in the figure). The first functional module is configured to enable the first body 1 to be electrically connected to the second body 2, so that the first body 1 and the second body 2 can transmit information. The first housing 11 includes a first middle frame 111 and a first support plate 112. The first middle frame 111 and the first support plate 112 form a first accommodating cavity 81. The first support plate 112 has a first surface facing away from the first accommodating cavity 81. The first surface is configured to support the display 4. A first gap is provided between the first middle frame 111 and the first support plate 112, and a second gap 213 is provided between a second middle frame 211 and a second support plate 212 (as shown in FIG. 5). Heights of the first gap and the second gap 213 are both greater than a thickness of the flexible printed circuit 6. The thickness of the flexible printed circuit 6, the height of the first gap, and the height of the second gap 213 are all dimensions in the X-axis direction, and the first gap and the second gap 213 allow the flexible printed circuit to pass through.

The first functional module is mounted outside the first accommodating cavity 81. The first functional module includes devices such as a first circuit board (printed circuit board, PCB) 12, a processor, a memory, and a communication module. The processor, the memory, and the communication module are integrated on the first circuit board 12. The memory and the communication module each are electrically connected to the processor. The memory is configured to store instructions and data. The communication module can implement wireless communication of the mobile phone, such as 3G/4G/5G. The communication module can further implement wireless communication such as a wireless local area network (wireless local area networks, WLAN), Bluetooth (bluetooth, BT), and near field communication (near field communication, NFC) of the mobile phone. The first functional module may further include devices for implementing other functions. The devices are not enumerated herein.

In this embodiment, the second body 2 includes a second housing 21 and a second functional module (not labeled in the figure). The second functional module is configured to enable the second body 2 to be electrically connected to the first body 1, so that the second body 2 and the first body 1 can transmit information. A second accommodating cavity 82 is provided in the second housing 21. The second housing 21 includes a second middle frame 211 and a second support plate 212. The second middle frame 211 and the second support plate 212 form the second accommodating cavity 82. The second support plate 212 has a second surface facing away from the second accommodating cavity 82. The second surface is configured to support the display 4.

The second functional module is mounted outside the second accommodating cavity 82. The second functional module includes devices such as a second circuit board 22, a battery, an antenna, a motor, and a sensor module. The antenna, the motor, and the sensor module are integrated on the second circuit board 22. The battery and the second circuit board 22 are stacked or arranged side by side. The stacking arrangement can save space, and the side-by-side arrangement can prevent heat-up of the mobile phone caused by accumulation of heat emitted by the battery and the second circuit board 22. The battery provides electric energy for the motor, the sensor module, the antenna, the display 4, and other devices, to ensure normal use of the mobile phone. The motor may generate a vibration alert, and may be specifically used for an incoming call vibration alert, or used for touch vibration feedback. The sensor module includes a gyroscope sensor, a temperature sensor, and the like. The gyroscope sensor may be configured to determine a motion posture of the mobile phone. The temperature sensor is configured to detect a temperature, so that the processor executes a temperature processing policy based on the temperature detected by the temperature sensor, to prevent an exception caused by overheat or a low temperature of the mobile phone. The second functional module may further include devices for implementing other functions. The devices are not enumerated herein.

In this embodiment, the rotating shaft portion 3 is a hinge, which is connected between the first housing 11 and the second housing 21, and is equivalent to a rotating structure between the first housing 11 and the second housing 21, so that the first housing 11 and the second housing 21 can freely rotate and be folded relative to each other. Specifically, the rotating shaft portion 3 includes two hinges, and the two hinges are respectively arranged on two sides of the mobile phone in the Y-axis direction. Alternatively, the rotary shaft portion 3 includes one hinge, and the hinge extends from one side to the other side of the mobile phone in the Y-axis direction. In another embodiment, the rotating shaft portion 3 is two rotating shafts that are connected and rotatable relative to each other. One of the rotating shafts is rotatably connected to the first housing 11 and the other of the rotating shafts is rotatably connected to the second housing 21, to implement relative rotation of the first housing 11 and the second housing 21. In another embodiment, the rotating shaft portion 3 may alternatively be a rotating structure of another structure, provided that relative free rotation and relative folding of the first housing 11 and the second housing 21 can be implemented without damaging the display.

In this embodiment, the display 4 is a flexible display, and has properties of being randomly bent, folded, and twisted.

When the display 4 is in the unfolded state, a display area is large, which facilitates viewing by a user and improves user experience. When the display 4 is in the folded state, a display area is small, which facilitates an operation performed by a user by a single hand and is convenient for storage and carrying.

In this embodiment, the middle cover 5 is mounted between the first housing 11 and the second housing 21. Specifically, the first housing 11 has a first groove 83, the second housing 21 has a second groove 84, the first groove 83 of the first housing 11 is opposite to the second groove 84 of the second housing 21, the first groove 83 of the first housing 11 communicates with the first accommodating cavity 81, the second groove 84 of the second housing 21 communicates with the second accommodating cavity 82, and the middle cover 5 is mounted in the first groove 83 and the second groove 84. The first accommodating cavity 81, the second accommodating cavity 82, the first groove 83, and the second groove 84 communicate to form the accommodating cavity 8. For ease of distinguishing between parts of the accommodating cavity 8, in FIG. 3, boundaries between the parts are denoted in dashed lines in the accommodating cavity 8. The middle cover 5 includes a support groove 51 and an appearance surface 52 facing away from the support groove 51. An opening of the support groove 51 faces the accommodating cavity 8. A bottom wall of the support groove 51 is used for the through-shaft portion of the flexible printed circuit 6. The appearance surface 52 faces away from the accommodating cavity 8. When the first housing 11 and the second housing 21 are unfolded relative to each other, the appearance surface 52 is blocked by partial structures of the first housing 11 and the second housing 21. When the first housing 11 and the second housing 21 are folded relative to each other, the appearance surface 52 is exposed and located between the first housing 11 and the second housing 21. In this embodiment, the middle cover 5 is prepared by using rigid plastic, so that a weight of the mobile phone can be reduced. In this case, the through-shaft portion of the flexible printed circuit 6 may be adhesively fastened to the middle cover 5. In another embodiment, the middle cover 5 is prepared by using a metal or an alloy that can be attracted by a magnetic member. In this case, the through-shaft portion of the flexible printed circuit 6 may be fastened to the middle cover 5 by attraction of a magnetic force, and does not need to be bonded. This can simplify difficulty in assembling the electronic device.

Figure 4:
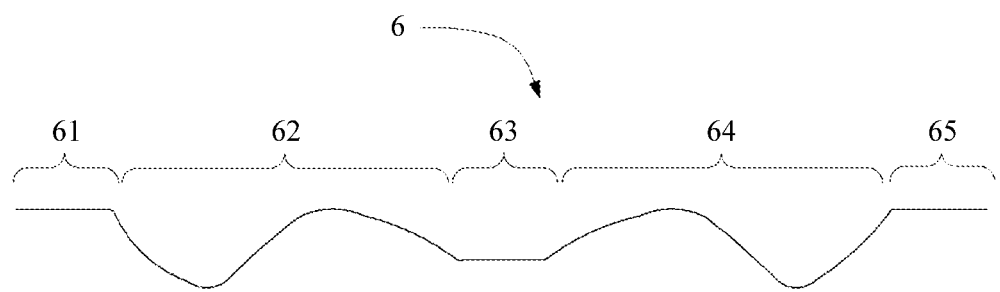
FIG. 4 is a schematic diagram of a structure of a flexible printed circuit shown in FIG. 3.

FIG. 4 is a schematic diagram of a structure of a flexible printed circuit shown in FIG. 3. The flexible printed circuit 6 is usually prepared by using a polyimide or polyester film as a substrate, and is characterized by free bending, folding, and twisting. The flexible printed circuit 6 is configured to connect the first circuit board 12 to the second circuit board 22, so that the devices in the first functional module can be electrically connected to and communicate with the devices in the second functional module. Specifically, the flexible printed circuit 6 includes a first connecting section 61, a first extending section 62, a through-shaft section 63, a second extending section 64, and a second connecting section 65 that are sequentially connected in the X-axis direction. The first extending section 62, the through-shaft section 63, and the second extending section 64 are all located in the accommodating cavity 8. Specifically, the first extending section 62 is located in the first accommodating cavity 81, the through-shaft section 63 is located in the first groove 83 and the second groove 84, the second extending section 64 is located in the second accommodating cavity 82, and the first connecting section 61 and the second connecting section 65 are both located outside the accommodating cavity 8. A side of the first connecting section 61 that is close to the first extending section 62 is located in the first gap, and a side of the second connecting section 65 that is close to the second extending section 64 is located in the second gap 213.

The first connecting section 61 extends out of the first accommodating cavity 81 and is connected to the first circuit board 12, and the first connecting section 61 is soldered and fastened to the first circuit board 12, so that the flexible printed circuit 6 is connected to the first circuit board 12. Specifically, the first connecting section 61 is provided with a first edge connector (not shown in the figure), the first edge connector is formed by arranging, in a finger-like shape, a plurality of conductive contacts whose surface is plated with gold, the first connecting section 61 and the first circuit board 12 are stacked, and the first edge connector is soldered to the first circuit board 12 to electrically connect the flexible printed circuit 6 to the first circuit board 12. The first extending section 62 is connected between the first connecting section 61 and the through-shaft section 63. The first extending section 62 is located in the first accommodating cavity 81 and is characterized by free bending, folding, and twisting in the first accommodating cavity 81. When the mobile phone is folded or unfolded, the first extending section 62 can be independently bent and deformed, to adapt to a displacement change occurring when the first body 1 and the second body 2 are bent or unfolded, thereby avoiding breaking the flexible printed circuit 6.

The through-shaft section 63 is located at the rotating shaft portion 3, so that the flexible printed circuit 6 passes through the rotating shaft portion 3 to electrically connect the first body 1 to the second body 2. The reinforcing plate 7 is provided on one surface of the rotating shaft portion 3, and the reinforcing plate 7 is adhesively fastened to a surface of the through-shaft section 63. The reinforcing plate 7 can increase structural strength of the through-shaft section 63 and prevent the through-shaft section 63 from being broken during repeated folding and unfolding of the mobile phone. Before the flexible printed circuit 6 is assembled to the mobile phone, the reinforcing plate 7 has been previously bonded to the through-shaft section of the flexible printed circuit 6. A surface of the reinforcing plate 7 that faces away from the through-shaft section 63 is fixedly connected to the middle cover 5, to prevent a location of the flexible printed circuit 6 from being displaced. The second extending section 64 is located in the second accommodating cavity 82 and is characterized by free bending, folding, and twisting in the second accommodating cavity 82. When the mobile phone is folded or unfolded, the second extending section 64 can be independently bent and deformed, to adapt to a displacement change occurring when the first body 1 and the second body 2 are bent or unfolded, thereby avoiding breaking the flexible printed circuit 6. FIG. 5 is an enlarged view of a location A in FIG. 3. The second connecting section 65 extends out of the second accommodating cavity 82 and is connected to the second circuit board 22, so that the flexible printed circuit 6 is connected to the second circuit board 22, and the second connecting section 65 is soldered and fastened to the second circuit board 22. Specifically, the second connecting section 65 is provided with a second edge connector, the second edge connector is formed by arranging, in a finger-like shape, a plurality of conductive contacts whose surface is plated with gold, the second connecting section 65 and the second circuit board 22 are stacked, and the second edge connector is soldered to the second circuit board 22 to electrically connect the flexible printed circuit 6 to the second circuit board 22.

In this embodiment, the first circuit board 12 and the second circuit board 22 are connected by using the flexible printed circuit 6, to electrically connect the devices in the first functional module to the devices in the second functional module. For example, devices such as the battery, the antenna, the motor, and the sensor module in the second functional module may all be connected to the processor in the first functional module by using the flexible printed circuit 6. The antenna in the second functional module may further be connected to the communication module in the first functional module by using the flexible printed circuit 6.

The first connecting section 61 is soldered and fastened to the first circuit board 12 by using the first edge connector, and the second connecting section 65 is soldered and fastened to the second circuit board 22 by using the second edge connector. Specifically, the first edge connector and the second edge connector are respectively provided on surfaces of the first connecting section 61 and the second connecting section 65 of the flexible printed circuit, or may be respectively provided on surfaces of the first circuit board 12 and the second circuit board 22, provided that the flexible printed circuit 6 can be electrically connected to the first circuit board 12 and the second circuit board 22. With the edge connectors for electrical connection, a thickness of a connection joint between the flexible printed circuit 6 and the first circuit board 12 and a thickness of a connection joint between the flexible printed circuit 6 and the second circuit board 22 are both greatly reduced. Compared with a conventional manner using a board-to-board (board to board, BTB) connector for connection, in this embodiment of this application, fastening is implemented by soldering, and the thicknesses of the connection joints each are less than or equal to 0.3 mm. This improves structural compactness of internal devices of the mobile phone, increases space utilization, reduces an overall thickness of the mobile phone, and facilitates a light and thin design of the mobile phone. In addition, compared with a conventional fastening manner based on board-to-board clipping, the thickness of the connection joint between the first circuit board 12 and the flexible printed circuit 6 and the thickness of the connection joint between the second circuit board 22 and the flexible printed circuit 6 are greatly reduced. When a height of a mounting region, between a first support plate and a first bearing plate, that is used for mounting the flexible printed circuit 6 and a height of a mounting region, between a second support plate and a second bearing plate, that is used for mounting the flexible printed circuit 6 are unchanged, as a total thickness resulted from the connection between the first circuit board 12 and the first connecting section 61 is reduced and a total thickness resulted from the connection between the second circuit board 22 and the second connecting section 65 is reduced, during disassembly and re-mounting of the flexible printed circuit 6, a distance in a height space reserved for the flexible printed circuit 6 to pass through is increased, and convenience in disassembling and mounting the flexible printed circuit 6 is improved.

As shown in FIG. 3, in this embodiment, a side of the first middle frame 111 that is away from the second middle frame 211 is provided with a first bearing plate 113. The first bearing plate 113 is located outside the accommodating cavity 8. The first bearing plate 113 includes a first bearing surface 1131 and a second bearing surface 1132 opposite to the first bearing surface 1131. The first connecting section 61 of the flexible printed circuit 6 is stacked on the first bearing surface 1131 of the first bearing plate 113. Referring to FIG. 5, a side of the second middle frame 211 that is away from the first middle frame 111 is provided with a second bearing plate 114. The second bearing plate 114 is located outside the accommodating cavity 8. The second bearing plate 114 includes a third bearing surface 1141 and a fourth bearing surface 1142 opposite to the third bearing surface 1141. The second connecting section 65 of the flexible printed circuit 6 is stacked on the third bearing surface 1141 of the second bearing plate 114.

In an implementation, the first bearing surface 1131 of the first bearing plate 113 is provided with a first accommodating groove. The third bearing surface 1141 of the second bearing plate 114 is provided with a second accommodating groove. The first accommodating groove and the second accommodating groove are configured to respectively accommodate the first circuit board 12 and the second circuit board 22, and respectively accommodate the first connecting section 61, of the flexible printed circuit 6, that is soldered to the first circuit board 12 and provided with the first edge connector, and the second connecting section 65, of the flexible printed circuit 6, that is soldered to the second circuit board 22 and provided with the second edge connector, so that the overall thickness of the mobile phone can be reduced in the Z-axis direction.

Figure 6:
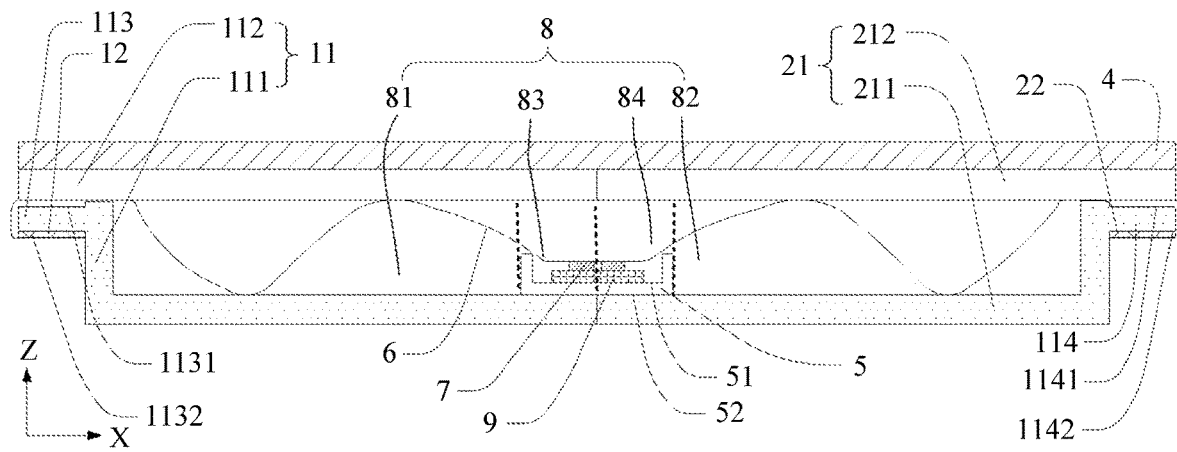
FIG. 6 is a schematic diagram of a planar structure of an electronic device according to another embodiment.

In another embodiment, FIG. 6 is a schematic diagram of a planar structure of an electronic device according to another embodiment. The first connecting section 61 of the flexible printed circuit 6 is stacked on the second bearing surface 1132 of the first bearing plate 113, and the second connecting section 65 of the flexible printed circuit 6 is stacked on the fourth bearing surface 1142 of the second bearing plate 114.

Figure 7:
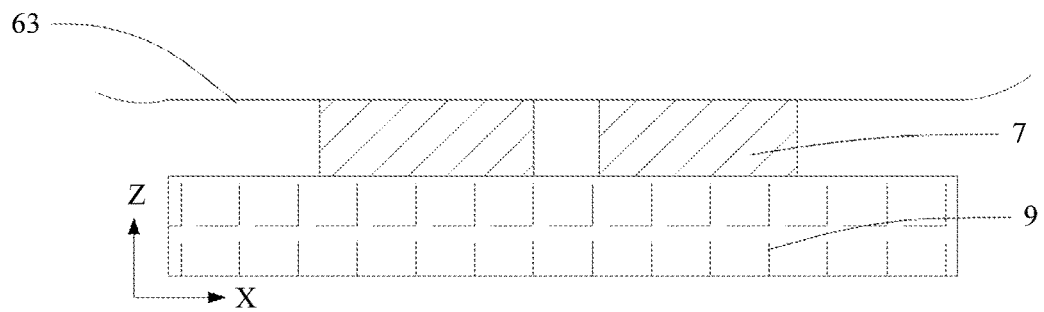
FIG. 7 is a schematic diagram of a planar structure in which a fastening block shown in FIG. 3 fastens a through-shaft section of a flexible printed circuit.

FIG. 7 is a schematic diagram of a planar structure in which a fastening block shown in FIG. 3 fastens a through-shaft section of a flexible printed circuit. In this embodiment, a fastening block 9 fixedly connected to the middle cover 5 is provided on the middle cover 5. Specifically, the fastening block 9 and the middle cover 5 may be integrally formed, and the fastening block 9 is a part of the middle cover 5. Alternatively, the fastening block 9 and the middle cover 5 may be separately formed, and the fastening block 9 is connected to the bottom wall of the support groove 51 of the middle cover 5. After the through-shaft section 63 of the flexible printed circuit 6 is pre-assembled with the reinforcing plate 7, the reinforcing plate 7 is fixedly connected to the middle cover 5 by using the fastening block 9. When the flexible printed circuit 6 is disassembled, the reinforcing plate 7 and the flexible printed circuit 6 are also disassembled.

Figure 8:
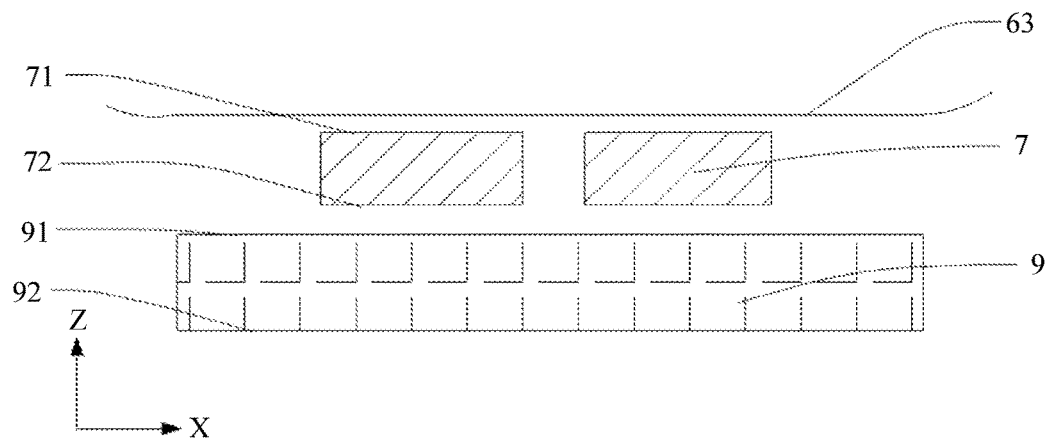
FIG. 8 is a schematic exploded view of FIG. 7.

Specifically, the fastening block 9 is a magnet with a magnetic property. The reinforcing plate 7 is prepared by using a metal or an alloy that can be attracted by a magnetic member. The metal that can be attracted by a magnetic member includes iron, cobalt, nickel, and the like, and the alloy that can be attracted by a magnetic member includes an iron-nickel alloy, an aluminum-iron alloy, an aluminum-nickel-cobalt alloy, and the like, so that the reinforcing plate 7 is magnetically fastened to the fastening block 9. FIG. 8 is a schematic diagram of a breakdown structure of FIG. 7. The reinforcing plate 7 has a first reinforcing surface 71 and a second reinforcing surface 72 that are opposite to each other. The first reinforcing surface 71 is adhesively fastened to the through-shaft section 63 of the flexible printed circuit 6. The second reinforcing surface 72 faces the fastening block 9 and is fixedly connected to the fastening block 9 by using a magnetic force. The reinforcing plate 7 prepared by using a metal or an alloy that can be attracted by a magnetic member has high structural strength. This can improve strength of the through-shaft section 63 and facilitate overall assembly of the mobile phone. There is a magnetic attraction force between the reinforcing plate 7 and the fastening block 9, so that the flexible printed circuit 6 can be fastened, and disassembly of the flexible printed circuit 6 can be facilitated. In another embodiment, the fastening block 9 has a magnetic surface and the reinforcing plate 7 also has a magnetic surface. The magnetic surface of the fastening block 9 and the magnetic surface of the reinforcing plate 7 can be attracted to each other, thereby fastening the reinforcing plate 7 by using the fastening block 9.

In this embodiment, the fastening block 9 has a first fastening surface 91 and a second fastening surface 92 that are opposite to each other. The first fastening surface 91 has a first magnetic pole and the second fastening surface 92 has a second magnetic pole. The first magnetic pole and the second magnetic pole are opposite to each other. Specifically, the first magnetic pole is an N pole, and the second magnetic pole is an S pole. Therefore, the fastening block 9 is enabled to impose a magnetic attraction force on the reinforcing plate 7, so as to fasten the through-shaft section 63 of the flexible printed circuit 6. In another embodiment, the first pole is an S pole and the second pole is an N pole. The first fastening surface 91 faces the reinforcing plate 7, and is magnetically connected to the second reinforcing surface 72 of the reinforcing plate 7. The second fastening surface 92 faces the middle cover 5, and is adhesively fastened and/or magnetically fastened to the bottom wall of the support groove 51 of the middle cover 5. The fastening block 9 is configured to fasten the reinforcing plate 7 to increase fastening reliability of the flexible printed circuit 6. In addition, a fastening force between the fastening block 9 and the middle cover 5 is greater than that between the fastening block 9 and the reinforcing plate 7, thereby preventing the fastening block 9 from loosening during the disassembly of the flexible printed circuit 6.

Specifically, in an implementation, the middle cover 5 is prepared by using a metal or an alloy that can be attracted by a magnetic member. The second fastening surface 92 of the fastening block 9 is fastened to the bottom wall of the support groove 51 of the middle cover 5 by using a magnetic force. In this case, no additional bonding operation is needed for the fastening block 9 and the middle cover 5, and assembly convenience can be increased. In an implementation, in addition to a magnetic force, a bonding force may exist between the middle cover 5 and the fastening block 9, thereby increasing fastening strength of the fastening block 9. In an implementation, the middle cover 5 is prepared by using rigid plastic without a magnetic property. In this case, the second fastening surface 92 of the fastening block 9 is adhesively fastened to the bottom wall of the support groove 51.

In another embodiment, the reinforcing plate 7 is directly fixedly connected to the middle cover 5. Specifically, the second reinforcing surface 72 of the reinforcing plate 7 is adhesively or magnetically fastened to the bottom wall of the support groove 51 of the middle cover 5. Specifically, in an implementation, the second reinforcing surface 72 of the reinforcing plate 7 is magnetically fastened to the bottom wall of the support groove 51 of the middle cover 5. Both the second reinforcing surface 72 and the bottom wall of the support groove 51 are magnetic surfaces, and the two magnetic surfaces can be attracted to each other to fixedly connect the reinforcing plate 7 to the middle cover 5. This can simplify a structure of the mobile phone and reduce a complexity degree of the structure of the mobile phone. In an implementation, the second reinforcing surface 72 of the reinforcing plate 7 is fastened to the bottom wall of the support groove 51 of the middle cover 5. In this case, both the reinforcing plate 7 and the middle cover 5 may be prepared by using lightweight rigid plastic, thereby reducing the weight of the mobile phone.

When the flexible printed circuit 6 becomes faulty and needs to be disassembled, an N pole of a magnet is made to approach the display 4. A repulsion force is generated between the magnet and an N pole of the first fastening surface 91, and the repulsion force weakens an attraction force imposed on the reinforcing plate 7. In this case, a fastening force imposed on the flexible printed circuit 6 between a press-fit plate 10 and the fastening block 9 is reduced, and a force required for withdrawing the flexible printed circuit 6 is reduced, thereby reducing difficulty in withdrawing the flexible printed circuit 6.

In this embodiment, the reinforcing plate 7 includes a support sheet 73 and a flexible region 74. The flexible region 74 divides the support sheet 73 into a plurality of sheet bodies 731, and the support sheet 73 is fixedly connected to the fastening block 9. When the flexible printed circuit 6 is moved, the flexible region 74 enables the reinforcing plate 7 to be flexibly deformed during movement of the flexible printed circuit. Specifically, the flexible region 74 enables the reinforcing plate 7 to have at least a capability of being bent and deformed in a length direction (the Y-axis direction) of the reinforcing plate 7, and the length direction of the reinforcing plate 7 is the same as the length direction (the Y-axis direction) of the electronic device 1000. The support sheet 73 is prepared by using a metal material with specific rigidity, such as a steel plate or another metal plate body. The support sheet 73 is configured to support the flexible printed circuit 6 and to enhance structural stability of the through-shaft section 63 of the flexible printed circuit 6. The reinforcing plate 7 including the flexible region 74 can ensure that the flexible printed circuit 6 is withdrawn without device disassembly, thereby preventing damage to the display or a rotating shaft structure.

Figure 9:
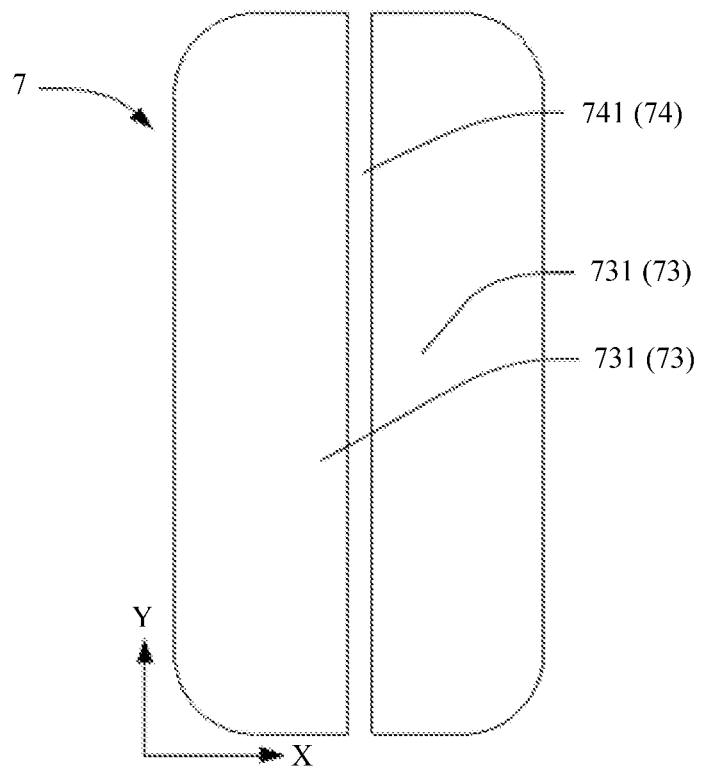
FIG. 9 is a schematic diagram of a case in which a support sheet of a reinforcing plate in an embodiment of the electronic device shown in FIG. 3 is mounted on a flexible printed circuit, where the support sheet has two sheet bodies.

In this embodiment, FIG. 9 is a schematic diagram of a case in which a support sheet of a reinforcing plate in an embodiment of the electronic device shown in FIG. 3 is mounted on a flexible printed circuit, where the support sheet has two sheet bodies. Specifically, the support sheet 73 has two strip-shaped sheet bodies 731. When the two sheet bodies 731 are mounted on the flexible printed circuit 6, the two sheet bodies 731 are fastened to a surface of the through-shaft section 63. There is a spacing 741 between the two sheet bodies 731 in the X-axis direction, and no rigid component exists in the spacing 741. Therefore, the flexible region 74 that enables the reinforcing plate 7 to be deformed in the Y-axis direction is formed in the spacing 741. In another embodiment, a quantity and shapes of the support sheets 73 may be set to another value and other shapes, respectively and shapes and a quantity of the spacings 741 forming the flexible region 74 may also be set to other shapes and another value, respectively.

In this embodiment, when the reinforcing plate 7 is assembled, the support sheet 73, that is, the two sheet bodies 731, of the reinforcing plate 7 may be bonded by using an adhesive film. Then, a side surface, of the adhesive film, to which the reinforcing plate 7 is bonded is made face the through-shaft section 63 of the flexible printed circuit 6, to transfer the reinforcing plate 7 to the flexible printed circuit 6 and then remove the adhesive film. The adhesive film is specifically adhesive tape, a plastic film coated with an adhesive layer, or the like.

In this embodiment, the support sheet 73 is fixedly connected to the fastening block 9, and the flexible region 74 is not connected to the fastening block 9. Therefore, there is no fastening force between the flexible region 74 and the fastening block 9. A contact area between each sheet body of the support sheet 73 and the fastening block 9 is less than a contact area between a whole sheet-like reinforcing plate including all sheet bodies and the fastening block 9 in a same area. Therefore, a fastening force between each sheet body and the fastening block 9 is less than a fastening force, in a same area, between the whole sheet-like reinforcing plate including all sheet bodies and the fastening block 9. In addition, there is no fastening force between the flexible region 74 and the fastening block 9. Therefore, compared with a conventional reinforcing plate, in this embodiment, a fastening force between the reinforcing plate 7 and the fastening block 9 is significantly reduced. In addition, when the flexible printed circuit 6 is moved, the flexible region 74 further enables the reinforcing plate 7 to be deformed at least in the Y-axis direction. In this case, the fastening force between the reinforcing plate 7 and the fastening block 9 is dispersed into a plurality of smaller forces. When the flexible printed circuit 6 is withdrawn, it is only necessary to overcome the plurality of smaller forces dispersed. Therefore, the flexible printed circuit 6 is withdrawn and replaced without device disassembly.

When the flexible printed circuit 6 becomes faulty and needs to be repaired or replaced, a rear cover of the mobile phone is removed, and at least parts of the first connecting section 61 and the second connecting section 65 are in a visible state. Then, the flexible printed circuit 6 can be withdrawn from the first body 1 and the second body 2 of the mobile phone in a width direction (the X-axis direction) of the mobile phone by applying a force on the first connecting section 61 or the second connecting section 65 in the visible state by using a tools such as tweezers or by using a finger directly.

Specifically, a solder joint between the first connecting section 61 and the first circuit board 12 is first removed by using a tool, or a force is directly applied to the first connecting section 61 to separate the first connecting section 61 from the first circuit board 12. Then, a solder joint between the second connecting section 65 and the second circuit board 22 is removed by using a tool, or a force is directly applied to the second connecting section 65 to separate the second connecting section 65 from the second circuit board 22. Next, the first connecting section 61 is pulled, so that a sheet body close to the first connecting section 61 is separated from the fastening block. The first connecting section 61 continues to be pulled, so that a sheet body close to the second connecting section 65 is separated from the fastening block. In this case, the flexible printed circuit is withdrawn from left to right (a direction in FIG. 3). When the flexible printed circuit 6 is withdrawn, except the first connecting section 61, remaining parts of the flexible printed circuit 6 sequentially pass through the second gap 213, the accommodating cavity 8, and the first gap, and the flexible printed circuit 6 is finally completely withdrawn. Certainly, after the first connecting section 61 is separated from the first circuit board 12 and the second connecting section 65 is separated from the second circuit board 22, a force may alternatively be applied to the second connecting section 65 to withdraw the flexible printed circuit from right to left. In this case, except the second connecting section 65, remaining parts of the flexible printed circuit 6 sequentially pass through the first gap, the accommodating cavity 8, and the second gap 213, and the flexible printed circuit 6 is finally completely withdrawn.

Figure 10:
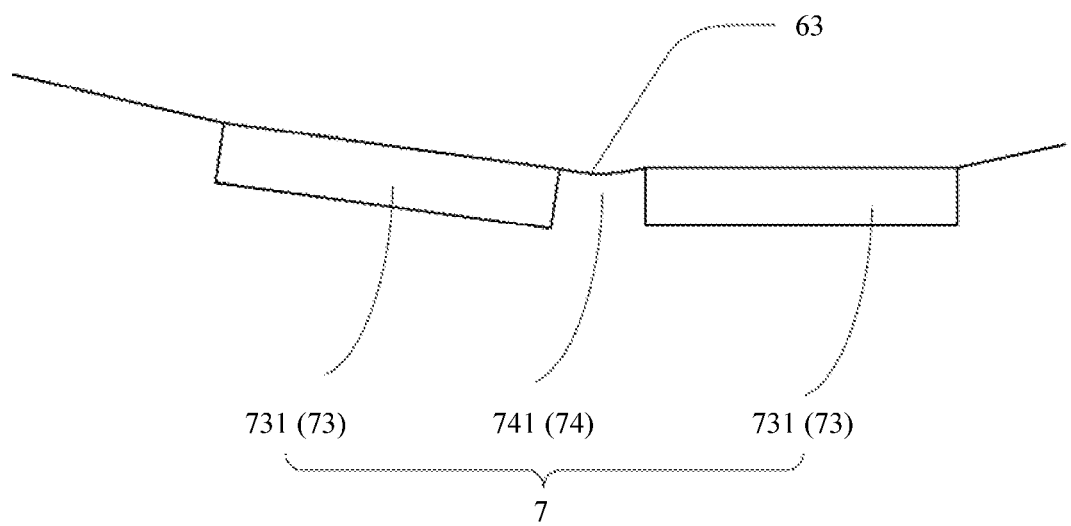
FIG. 10 is a schematic diagram of a structure in which the reinforcing plate shown in FIG. 9 is bent and deformed under driving by a through-shaft section of a flexible printed circuit.

FIG. 10 is a schematic diagram of a structure in which the reinforcing plate shown in FIG. 9 is bent and deformed under driving by a through-shaft section of a flexible printed circuit. As the fastening force between the reinforcing plate 7 and the fastening block 9 is small and the flexible region 74 can enable the reinforcing plate 7 to be bent and deformed, when the flexible printed circuit 6 is withdrawn, the flexible printed circuit 6 is moved to drive the flexible region 74 to be deformed, so that the reinforcing plate 7 as a whole is bent and deformed in the length direction of the reinforcing plate 7. In this case, the fastening force imposed on the reinforcing plate 7 is dispersed by a plurality of support sheets. Therefore, one sheet bodies 73 can be separated from the fastening block 9 by using a small force, and then another sheet body 731 can be separated from the fastening block 9 by using a small force. Finally, the flexible printed circuit 6 is withdrawn as a whole. No device disassembly is needed throughout a process of withdrawing the flexible printed circuit 6. This avoids disassembling the display 4 or the middle frame, ensures smooth replacement of the flexible printed circuit 6, and avoids damage to the display or a folding structure during the replacement of the flexible printed circuit 6.

After the faulty flexible printed circuit is withdrawn, another flexible printed circuit is mounted on the mobile phone. This flexible printed circuit is pre-assembled with a reinforcing plate, and then a second connecting section is inserted into the accommodating cavity 8 from the first gap between the first middle frame 111 and the first support plate 112, and after passing over the fastening block 9 in the accommodating cavity 8, the second connecting section extends out of the accommodating cavity 8 from the second gap 213 between the second middle frame 211 and the second support plate 212. In this case, a first connecting section is temporarily fastened, and a force is applied to the second connecting section, so that a second extending section extends out of the accommodating cavity 8, until it is perceived that an attraction force is generated between the reinforcing plate on a through-shaft section and the fastening block 9. At this time, it is proved that the through-shaft section corresponds to the fastening block 9 and is fastened to the fastening block 9 by attraction. Then, the second extending section is inserted into the accommodating cavity 8 again, and finally the first connecting section is soldered to the first circuit board 12, and the second connecting section is soldered to the second circuit board 22, to complete mounting of the another flexible printed circuit. Throughout the process, except the first connecting section, remaining parts of the flexible printed circuit sequentially pass through the first gap and enter the accommodating cavity, and the second connecting section passes through the second gap from the accommodating cavity 8, so as to extend out of the accommodating cavity 8. Certainly, the first connecting section may alternatively be inserted into the accommodating cavity 8 from the second gap 213. Throughout the process of this mounting method, except the second connecting section, other parts of the flexible printed circuit sequentially pass through the second gap 213 and enter the accommodating cavity, and the first connecting section then passes through the first gap from the accommodating cavity 8, so as to extend out of the accommodating cavity 8.

Figure 11:
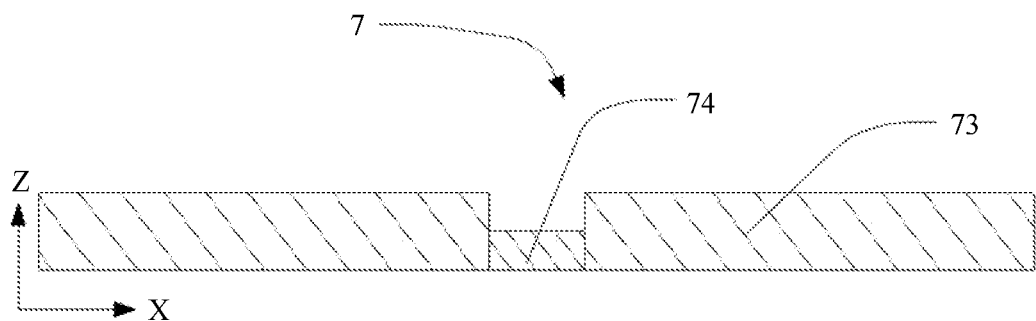
FIG. 11 is a schematic diagram of a structure of a reinforcing plate in an embodiment of the electronic device shown in FIG. 3.

In another embodiment, FIG. 11 is a schematic diagram of a structure of a reinforcing plate in an embodiment of the electronic device shown in FIG. 3. The flexible region 74 may be prepared by using a flexible material that connects the support sheet 73. Specifically, the flexible material is a plastic film, a film layer prepared by using the flexible material forms the flexible region 74. When the flexible region 74 is a film layer formed by a flexible material, the reinforcing plate 7 can be directly fastened to the through-shaft section 63 of the flexible printed circuit 6 without assistance from an additional tool, thereby simplifying an assembly process and saving an assembly time.

Figure 12:
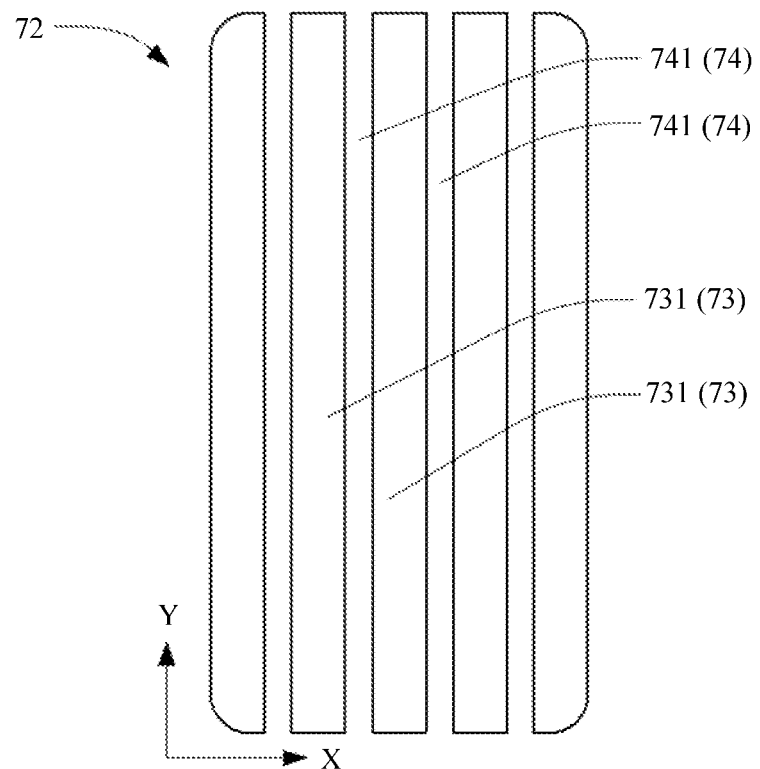
FIG. 12 is a schematic diagram of a case in which a support sheet of a reinforcing plate in an embodiment of the electronic device shown in FIG. 3 is mounted on a flexible printed circuit, where the support sheet has five sheet bodies.

In another embodiment, the support sheet 73 has a plurality of sheet bodies 731 arranged in an array, and the flexible region 74 is formed when the support sheet 73 is mounted on the flexible printed circuit 6. Herein, "a plurality of" means two or more. For example, FIG. 12 is a schematic diagram of a case in which a support sheet of a reinforcing plate in an embodiment of the electronic device shown in FIG. 3 is mounted on a flexible printed circuit, where the support sheet has five sheet bodies. Specifically, the support sheet 73 has five strip-shaped sheet bodies 731. When the five sheet bodies 731 are fastened to the through-shaft section 63, a strip-shaped spacing 741 exists between any two adjacent sheet bodies 731 in the X-axis direction. The five sheet bodies 731 form four spacings 741, and the four spacings 741 and the five sheet bodies 731 are alternately distributed in the X-axis direction of the reinforcing plate 7.

Figure 14:
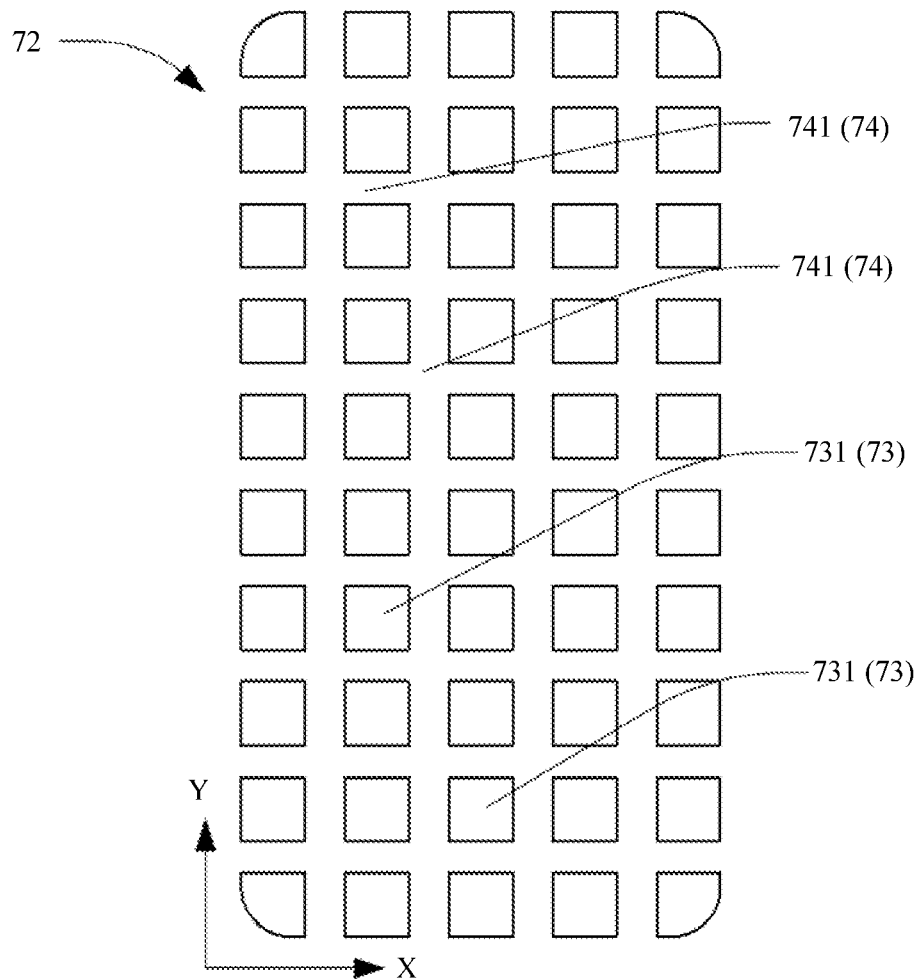
FIG. 14 is a schematic diagram of a case in which a support sheet of a reinforcing plate in an embodiment of the electronic device shown in FIG. 3 is mounted on a flexible printed circuit, where the support sheet has a plurality of sheet bodies.

In another embodiment, FIG. 14 is a schematic diagram of a case in which a support sheet of a reinforcing plate in an embodiment of the electronic device shown in FIG. 3 is mounted on a flexible printed circuit, where the support sheet has a plurality of sheet bodies. Specifically, the support sheet 73 has square sheet bodies 731 arranged in 10 rows and 5 columns. A spacing 741 exists between any two adjacent sheet bodies 731, and the spacings 741 are connected to each other. In another embodiment, a plurality of sheet bodies 731 are arranged out of order, and the sheet bodies 731 are triangular, circular, pentagonal, hexagonal, trapezoidal, or elliptical in shape. In this application, "a plurality of" means two or more. The reinforcing plate 7 is integrally formed and has a plurality of spacings 741. This not only can improve assembly convenience, but also can improve convenience in withdrawing the flexible printed circuit 6.

Figure 13:
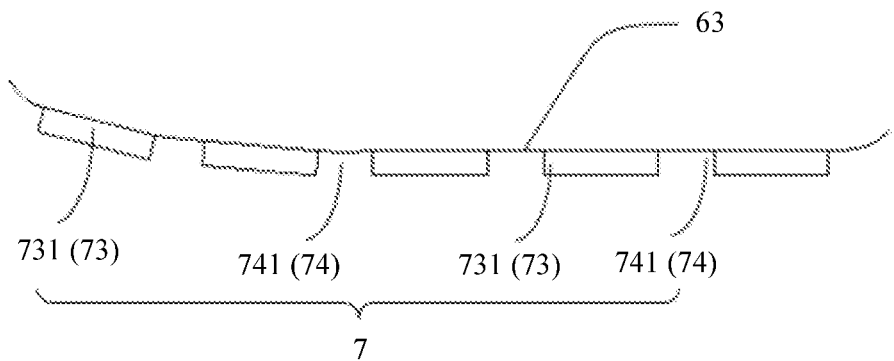
FIG. 13 is a schematic diagram of a structure in which the reinforcing plate shown in FIG. 12 is bent and deformed under driving by a through-shaft section of a flexible printed circuit.

When a quantity of sheet bodies 731 of the support sheet 73 increases, accordingly, a quantity of spacings 741 forming the flexible region 74 increases, a quantity of locations at which the reinforcing plate 7 can be deformed increases, and a flexibility degree also increases. A larger quantity and a larger total area of spacings 741 forming the flexible region 74 indicates a smaller contact area between the reinforcing plate 7 and the fastening block 9 and a smaller fastening force between the reinforcing plate 7 and the fastening block 9. A higher flexibility degree of the reinforcing plate 7 indicates a larger quantity of locations at which deformation occurs and more dispersed fastening forces between the reinforcing plate 7 and the fastening block 9. Therefore, FIG. 13 is a schematic diagram of a structure in which the reinforcing plate shown in FIG. 12 is bent and deformed under driving by a through-shaft section of a flexible printed circuit. When the flexible printed circuit 6 is withdrawn, on a premise that a total fastening force decreases, the reinforcing plate 7 is deformed at a plurality of locations. With the locations corresponding to deformation being used as a separation line, it is equivalent that the reinforcing plate 7 is divided into a plurality of parts and withdrawn. A smaller force is needed each time one part is withdrawn, so that the flexible printed circuit 6 can be conveniently withdrawn.

In another embodiment, the reinforcing plate 7 includes the five sheet bodies 731 shown in FIG. 12 serving as the support sheet 73. A difference from the reinforcing plate 7 shown in FIG. 12 lies in that, a film layer formed by a flexible material is provided in the four spacings 741 to serve as the flexible region 74. In another embodiment, the reinforcing plate includes the plurality of sheet bodies 731 shown in FIG. 14 serving as the support sheet 73. A difference from the reinforcing plate 7 shown in FIG. 14 lies in that, a film layer formed by a flexible material is provided in the plurality of spacings 741 to serve as the flexible region 74. When the flexible region 74 is prepared by using a film layer formed by a flexible material, the reinforcing plate 7 can be directly fastened to the through-shaft section 63 of the flexible printed circuit 6 without assistance from an additional tool, thereby simplifying an assembly process and saving an assembly time.

Figure 15:
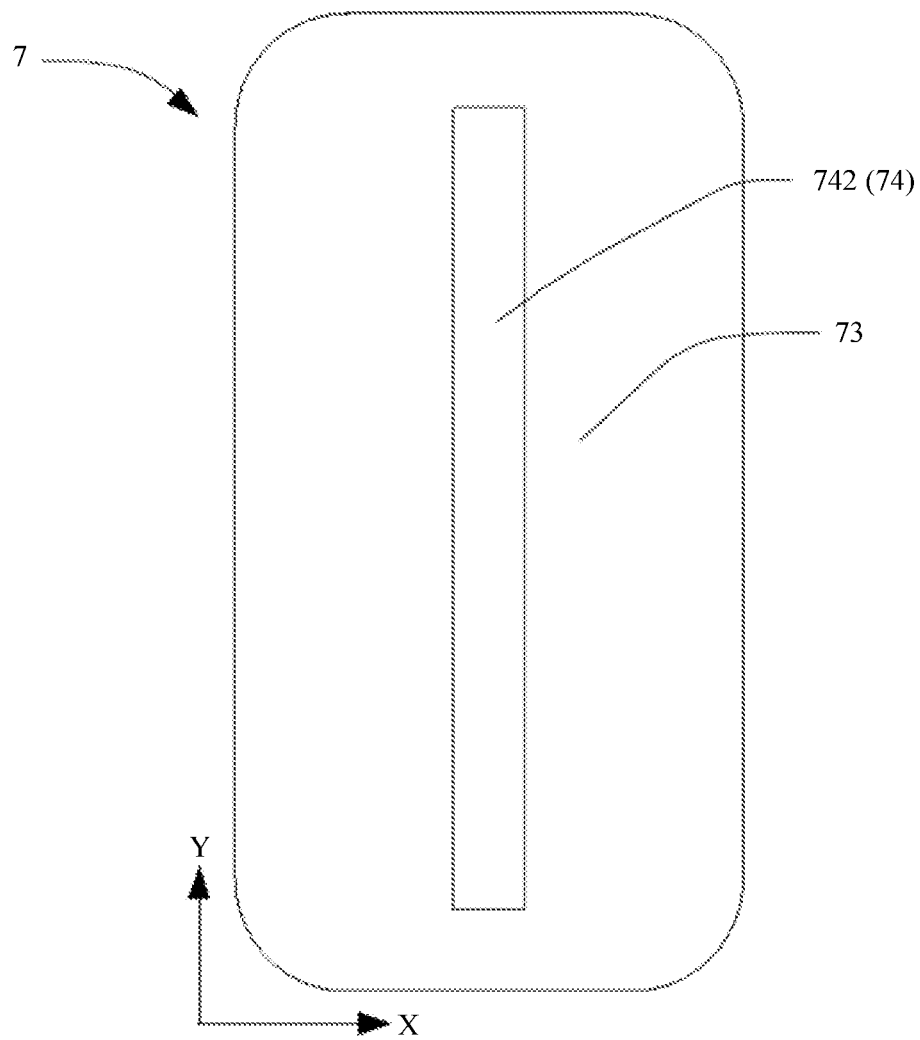
FIG. 15 is a schematic diagram of a case in which a flexible region of a reinforcing plate in an embodiment of the electronic device shown in FIG. 3 is provided on a support sheet of the reinforcing plate, where the flexible region includes one hollow region.

In an embodiment, the flexible region 74 is provided on the support sheet 73 of the reinforcing plate 7. Specifically, FIG. 15 is a schematic diagram of a case in which a flexible region of a reinforcing plate in an embodiment of the electronic device shown in FIG. 3 is provided on a support sheet of the reinforcing plate, where the flexible region includes one hollow region. In this embodiment, the flexible region 74 is a hollow region 742 provided on the support sheet 73 and extending in the Y-axis direction of the reinforcing plate 7. An axis of the hollow region 742 in the Y-axis direction coincides with an axis of the reinforcing plate 7 in the Y-axis direction. The support sheet 73 is a sheet body that surrounds the hollow region 742, and the hollow region 742 is strip-shaped. In another embodiment, the axis of the hollow region 742 in the Y-axis direction is staggered with the axis of the reinforcing plate 7 in the Y-axis direction, and the hollow region 742 has an elliptical, rectangular, or trapezoidal shape. The support sheet 73 surrounds the hollow region 742. This can increase structural strength of the reinforcing plate 7 and facilitate mounting.

Therefore, a contact area between the support sheet 73 and the fastening block 9 is less than a contact area between a whole sheet-like reinforcing plate provided with no hollow region and the fastening block 9 in a same area. Therefore, a fastening force between the support sheet 73 and the fastening block 9 is less than a fastening force, in a same area, between the whole sheet-like reinforcing plate provided with no hollow region and the fastening block 9, and there is no fastening force between the hollow region 742 and the fastening block 9. Compared with that of a conventional reinforcing plate, the fastening force between the reinforcing plate 7 and the fastening block 9 is significantly reduced. The flexible region 74 further enables the reinforcing plate 7 to be deformed in the Y-axis direction. In this case, the fastening force between the reinforcing plate 7 and the fastening block 9 is dispersed into a plurality of smaller forces. When the flexible printed circuit 6 is withdrawn, it is only necessary to overcome the plurality of smaller forces dispersed, so that the flexible printed circuit 6 is withdrawn and replaced without device disassembly.

Figure 16:
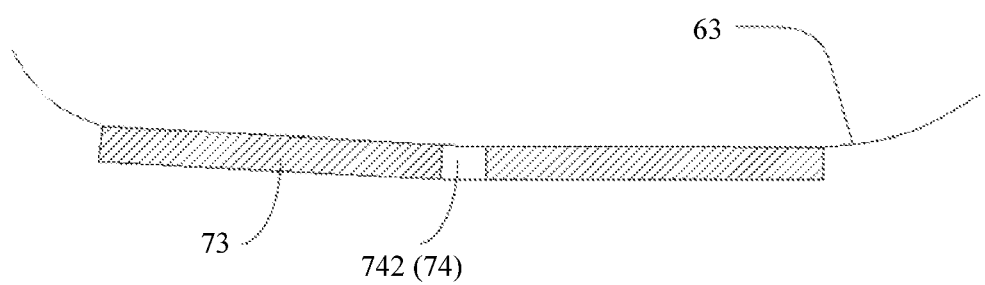
FIG. 16 is a schematic diagram of a structure in which the reinforcing plate shown in FIG. 15 is bent and deformed under driving by a through-shaft section of a flexible printed circuit.

When the flexible printed circuit 6 becomes faulty and needs to be repaired or replaced, the flexible printed circuit 6 is withdrawn from the first body 1 and the second body 2 of the mobile phone in the X-axis direction. Specifically, FIG. 16 is a schematic diagram of a structure in which the reinforcing plate shown in FIG. 15 is bent and deformed under driving by a through-shaft section of a flexible printed circuit. As the fastening force between the reinforcing plate 7 and the fastening block 9 is small and the flexible region 74 can enable the reinforcing plate 7 to be bent and deformed, when the flexible printed circuit 6 is withdrawn, the flexible printed circuit 6 is moved to drive the flexible region 74 to be deformed, so that the reinforcing plate 7 as a whole is bent and deformed in the length direction of the reinforcing plate 7. In this case, two parts of the support sheet 73 that are located on two sides of the hollow region 742 may be separately separated from the fastening block 9. A force needed for separating each part is small. Finally, the flexible printed circuit 6 is withdrawn as a whole. No device disassembly is needed throughout a process of withdrawing the flexible printed circuit 6. This ensures smooth replacement of the flexible printed circuit 6, and avoids damage to the display or a folding structure during the replacement of the flexible printed circuit 6.

Figure 17:
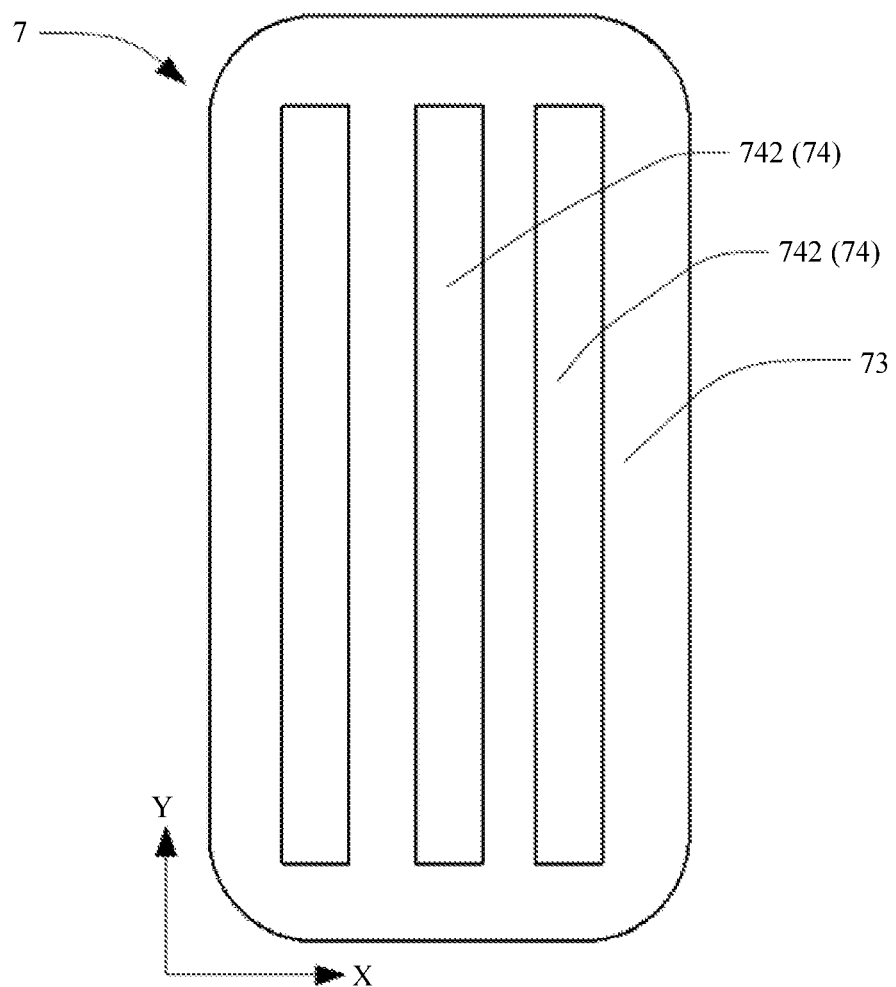
FIG. 17 is a schematic diagram of a case in which a flexible region of a reinforcing plate in an embodiment of the electronic device shown in FIG. 3 is provided on a support sheet of the reinforcing plate, where the flexible region includes three hollow regions arranged along an X-axis.
Figure 18:
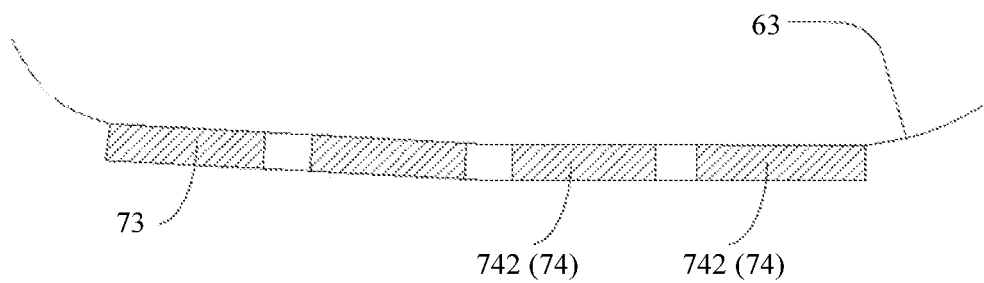
FIG. 18 is a schematic diagram of a structure in which the reinforcing plate shown in FIG. 17 is bent and deformed under driving by a through-shaft section of a flexible printed circuit.

In another embodiment, FIG. 17 is a schematic diagram of a case in which a flexible region of a reinforcing plate in an embodiment of the electronic device shown in FIG. 3 is provided on a support sheet of the reinforcing plate, where the flexible region includes three hollow regions arranged along an X-axis. The flexible region 74 is provided on the support sheet 73 of the reinforcing plate 7. The flexible region 74 has a plurality of hollow regions 742 provided on the support sheet 73. The support sheet 73 is a sheet body 731, and the plurality of hollow regions 742 are arranged in an array on the sheet body 731. For example, referring to FIG. 17, the flexible region 74 specifically has three square hollow regions 742 extending in the Y-axis direction. Specifically, the three hollow regions 742 are distributed at spacings 741 in the X-axis direction of the sheet body 731. In this case, the reinforcing plate 7 can maintain an overall structure for easy assembly. In addition, FIG. 18 is a schematic diagram of a structure in which the reinforcing plate shown in FIG. 17 is bent and deformed under driving by a through-shaft section of a flexible printed circuit. Bending and deformation occur at a plurality of locations in the Y-axis direction, thereby reducing the fastening force between the reinforcing plate 7 and the fastening block.

Figure 19:
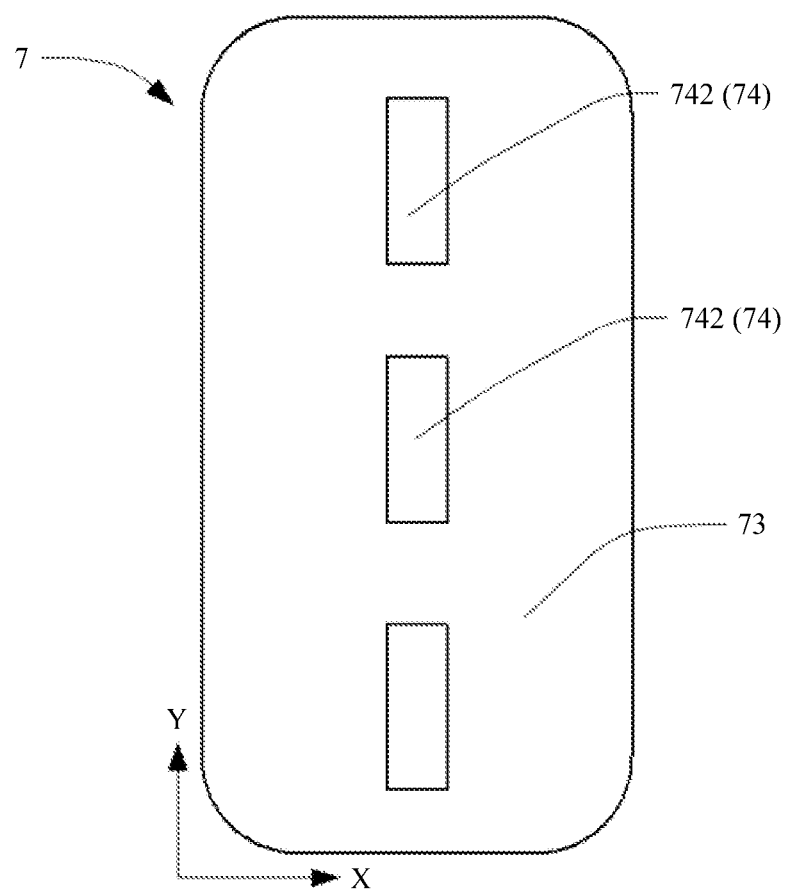
FIG. 19 is a schematic diagram of a case in which a flexible region of a reinforcing plate in an embodiment of the electronic device shown in FIG. 3 is provided on a support sheet of the reinforcing plate, where the flexible region includes three hollow regions arranged along a Y-axis.
Figure 20:
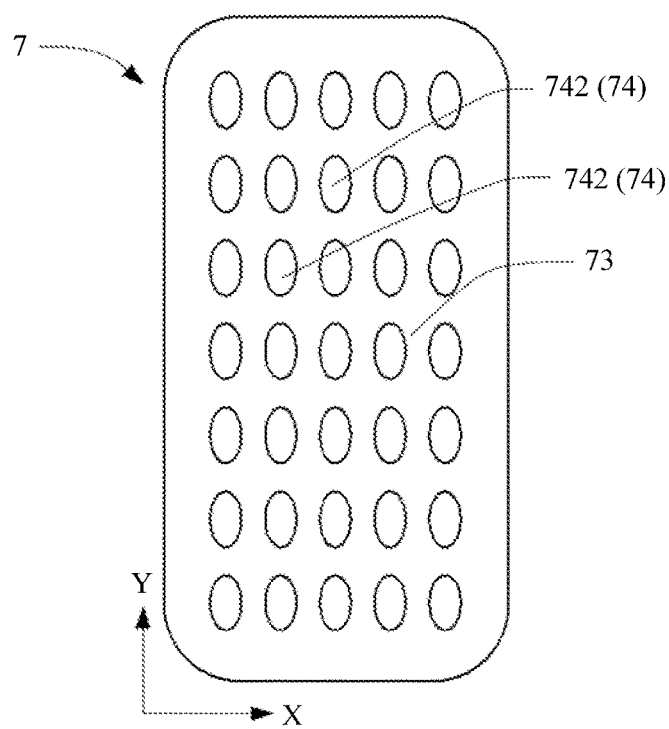
FIG. 20 is a schematic diagram of a case in which a flexible region of a reinforcing plate in an embodiment of the electronic device shown in FIG. 3 is provided on a support sheet of the reinforcing plate, where the flexible region includes a plurality of hollow regions arranged in an array.

FIG. 19 is a schematic diagram of a case in which a flexible region of a reinforcing plate in an embodiment of the electronic device shown in FIG. 3 is provided on a support sheet of the reinforcing plate, where the flexible region includes three hollow regions arranged along a Y-axis. Specifically, the three hollow regions 742 are distributed at spacings 741 in the Y-axis direction of the sheet body 731. In this case, the reinforcing plate 7 has high structural strength, and can be bent and deformed in the Y-axis direction, to disperse the fastening force between the reinforcing plate 7 and the fastening block 9. Alternatively, FIG. 20 is a schematic diagram of a case in which a flexible region of a reinforcing plate in an embodiment of the electronic device shown in FIG. 3 is provided on a support sheet of the reinforcing plate, where the flexible region includes a plurality of hollow regions arranged in an array. Specifically, the flexible region 74 includes elliptical hollow regions 742 arranged in 7 rows and 5 columns. In this case, the reinforcing plate 7 can be bent and deformed at a plurality of locations in the Y-axis direction, to disperse the fastening force between the reinforcing plate 7 and the fastening block 9. In another embodiment, a plurality of hollow regions 742 are arranged out of order, and the hollow regions 742 are triangular, circular, pentagonal, hexagonal, trapezoidal, or elliptical in shape.

When a quantity of hollow regions 742 increases, a quantity of locations at which the reinforcing plate 7 can be deformed increases, and a flexibility degree also increases. A larger quantity and a larger total area of hollow regions 742 indicates a smaller contact area between the reinforcing plate 7 and the fastening block 9 and a further reduced fastening force between the reinforcing plate 7 and the fastening block 9. A higher flexibility degree of the reinforcing plate 7 indicates a larger quantity of locations at which deformation occurs and more dispersed fastening forces between the reinforcing plate 7 and the fastening block 9. Therefore, when the flexible printed circuit 6 is withdrawn, on a premise that a total fastening force decreases, the reinforcing plate 7 is deformed at a plurality of locations. With the locations corresponding to deformation being used as a separation line, it is equivalent that the reinforcing plate 7 is divided into a plurality of parts and withdrawn. A smaller force is needed each time one part is withdrawn, so that the flexible printed circuit 6 can be conveniently withdrawn.

In another embodiment, the reinforcing plate 7 includes the support sheet 73 and the flexible region that are shown in FIG. 15. A difference from the reinforcing plate 7 shown in FIG. 15 lies in that, the flexible region is prepared by using a film layer formed by a flexible material, to replace the hollow region shown in FIG. 15. In another embodiment, the reinforcing plate 7 includes the support sheet 73 shown in FIG. 17. A difference from the reinforcing plate 7 shown in FIG. 17 lies in that, a film layer formed by a flexible material is provided in the three hollow regions distributed in the X-axis direction, to serve as the flexible region 74. In another embodiment, the reinforcing plate 7 includes the support sheet 73 shown in FIG. 19. A difference from the reinforcing plate 7 shown in FIG. 19 lies in that, a film layer formed by a flexible material is provided in the three hollow regions distributed in the Y-axis direction, to serve as the flexible region 74. In another embodiment, the reinforcing plate 7 includes the integrated support sheet 73 shown in FIG. 20. A difference from the reinforcing plate 7 shown in FIG. 20 lies in that, a film layer formed by a flexible material is provided in the hollow regions arranged in 7 rows and 5 columns, to serve as the flexible region 74. When the flexible region 74 is prepared by using a film layer formed by a flexible material, the reinforcing plate 7 can be directly fastened to the through-shaft section 63 of the flexible printed circuit 6 without assistance from an additional tool, thereby simplifying an assembly process and saving an assembly time.

In this embodiment, the reinforcing plate 7 is prepared by using a cutting method or an etching method. Specifically, an integral sheet material is etched by using the etching method to obtain a hollow region 742, the hollow region 742 forms the flexible region 74, and an unetched sheet body 731 forms the support sheet 73, thereby preparing the reinforcing plate 7. When the support sheet 73 has a plurality of sheet bodies 731, an integral sheet material may alternatively be cut into a plurality of sheet bodies 731 by using the cutting method, and some of the sheet bodies 731 may be removed. When remaining sheet bodies 731 are bonded to the through-shaft section 63 of the flexible printed circuit 6, spacings 741 between the sheet bodies 731 form the flexible region 74, and the sheet bodies 731 bonded to the through-shaft section 63 form the support sheet 73.

In this embodiment, a length of the reinforcing plate 7 is from 18 mm to 22 mm, a width of the reinforcing plate 7 is from 5 mm to 7 mm, and a thickness of the reinforcing plate 7 is from 0.1 mm to 0.3 mm. Specifically, the length of the reinforcing plate 7 is 18 mm, 19 mm, 20 mm, 21 mm, or 22 mm, the width of the reinforcing plate 7 is 5 mm, 6 mm, or 7 mm, and the thickness of the reinforcing plate 7 is 0.1 mm, 0.2 mm, or 0.3 mm.

Figure 21:
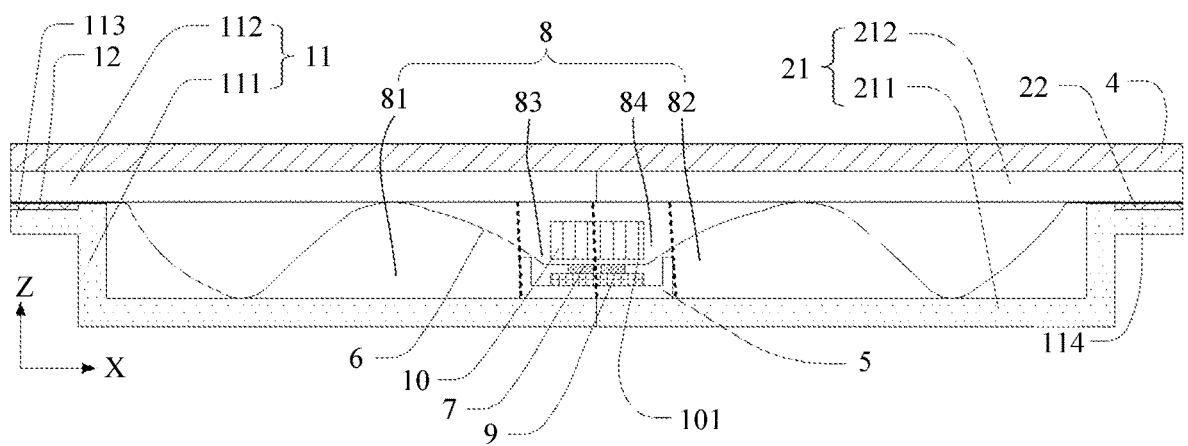
FIG. 21 is a schematic diagram of a planar structure of an electronic device including a press-fit plate.

In an embodiment, FIG. 21 is a schematic diagram of a planar structure of an electronic device including a press-fit plate. The electronic device further includes a press-fit plate 10. A length of the press-fit plate 10 in the Y-axis direction is greater than that of the flexible printed circuit 6 in the Y-axis direction. Connecting wings are respectively provided at two opposite ends of the press-fit plate 10 in the Y-axis direction. The press-fit plate 10 is fixedly connected to the bottom wall of the support groove 51 by using the connecting wings. Specifically, the connecting wings are fastened to the bottom wall of the support groove by using screws.

Specifically, there is a spacing between the press-fit plate 10 and the bottom wall of the support groove 51, the fastening block 9, the through-shaft section 63, and the reinforcing plate 7 each are located in the spacing, the press-fit plate 10 has a press-fit surface 101 facing the reinforcing plate 7, there is a spacing between the press-fit surface 101 and a surface of the through-shaft section that faces away from the reinforcing plate 7, and the spacing is greater than 1.3 mm and less than or equal to 1.7 mm in the Z-axis direction. For example, the spacing is 1.3 mm, 1.5 mm, or 1.7 mm. The press-fit plate 10 plays a function of shaping the through-shaft section 63. In a use process of the mobile phone, repeated unfolding and folding cause the through-shaft section 63 to be bent and deformed along with the unfolding and folding of the mobile phone. During repeated bending and deformation of the through-shaft section, the press-fit plate 10 can prevent forming a wrinkle part that is difficult to unfold, so as to ensure that the flexible printed circuit 6 is not broken due to a produced wrinkle, thereby prolonging a service life of the flexible printed circuit 6. There is a proper spacing between the press-fit surface 101 and the surface of the through-shaft section that faces away from the reinforcing plate 7. This can facilitate withdrawal of the flexible printed circuit 6 without causing an excessively large thickness of the mobile phone.

The foregoing descriptions are merely some embodiments and implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, comprising a first body, a second body, a middle cover, and a flexible printed circuit; wherein
the flexible printed circuit comprises a through-shaft section, a reinforcing plate is provided on a surface of the through-shaft section, and the reinforcing plate comprises a support sheet and a flexible region; and the flexible region is provided on the support sheet or divides the support sheet into a plurality of sheet bodies, and the support sheet is stacked on and fastened to a surface of the through-shaft section; and
the first body and the second body are rotatably connected to two opposite sides of the middle cover, respectively, and the electronic device comprises a gap connecting the first body, the second body, and the middle cover; and the flexible printed circuit is located in the gap and extends from the first body to the second body to connect the first body and the second body, the reinforcing plate is located in the middle cover, and the support sheet is fastened to the middle cover.

2. The electronic device according to claim 1, wherein the support sheet is adhesively fastened to the middle cover; or the support sheet has a magnetic surface, the middle cover has a magnetic surface, and the support sheet and the middle cover are fastened by magnetic attraction.

3. The electronic device according to claim 1, wherein the electronic device further comprises a magnetic fastening block, the fastening block is fastened in the middle cover, and the reinforcing plate is magnetically connected to the fastening block.

4. The electronic device according to claim 1, wherein a plurality of sheet bodies are mounted on the flexible printed circuit, and every two of the sheet bodies are spaced and form the flexible region.

5. The electronic device according to claim 1, wherein the flexible region is a hollow region running through the support sheet.

6. The electronic device according to claim 5, wherein there are a plurality of hollow regions, and the plurality of hollow regions are regularly arranged on the support sheet.

7. The electronic device according to claim 1, wherein the support sheet comprises a plurality of sheet bodies, the flexible region is a film layer formed by a flexible material, and every adjacent two of the sheet bodies are connected by using the film layer.

8. The electronic device according to claim 1, wherein the support sheet is provided with a hollow region, the hollow region is provided with a film layer formed by a flexible material, and the film layer forms the flexible region.

9. The electronic device according to claim 1, wherein the middle cover comprises a support groove, and the support sheet is provided in the support groove and is fixedly connected to a bottom wall of the support groove.

10. The electronic device according to claim 1, wherein the first body and the second body form an accommodating cavity, the flexible printed circuit further comprises a first connecting section and a second connecting section that are located outside the accommodating cavity, and the first connecting section and the second connecting section are located at two opposite ends of the flexible printed circuit; and the through-shaft section is located between the first connecting section and the second connecting section, and the through-shaft section is located in the accommodating cavity; and
the first body comprises a first bearing plate and a first circuit board that are located outside the accommodating cavity, and the second body comprises a second bearing plate and a second circuit board that are located outside the accommodating cavity; and the first circuit board is stacked on the first bearing plate, the second circuit board is stacked on the second bearing plate, and the first connecting section and the second connecting section are electrically connected to the first circuit board and the second circuit board, respectively.

11. The electronic device according to claim 10, wherein the first bearing plate is provided with a first accommodating groove, the second bearing plate is provided with a second accommodating groove, the first circuit board and the first connecting section are located in the first accommodating groove, and the second circuit board and the second connecting section are located in the second accommodating groove.

12. The electronic device according to claim 10, wherein the first circuit board is soldered and fastened to the first connecting section by using a first edge connector, and the second circuit board is soldered and fastened to the second connecting section by using a second edge connector.

13. The electronic device according to claim 10, wherein the first bearing plate comprises a first bearing surface and a second bearing surface opposite to the first bearing surface; and the second bearing plate comprises a third bearing surface and a fourth bearing surface opposite to the third bearing surface; and the first circuit board is stacked on the first bearing surface or the second bearing surface, and the second circuit board is stacked on the third bearing surface or the fourth bearing surface.

14. The electronic device according to claim 10, wherein the first body comprises a first middle frame and a first support plate, the second body comprises a second middle frame and a second support plate, and the first middle frame, the first support plate, the second middle frame, and the second support plate form the accommodating cavity; and the gap comprises a first gap and a second gap, the first middle frame and the first support plate form the first gap, the second middle frame and the second support plate form the second gap, a part of the first connecting section is located in the first gap, and a part of the second connecting section is located in the second gap; and heights of both the first gap and the second gap are greater than a thickness of the flexible printed circuit.

15. The electronic device according to claim 1, wherein the electronic device further comprises a press-fit plate, the press-fit plate is fixedly connected to the middle cover, the press-fit plate has a press-fit surface, and the press-fit surface faces a surface of the through-shaft section that faces away from the support sheet; and in a thickness direction of the electronic device, there is a spacing between the press-fit surface and the surface of the through-shaft section that faces away from the support sheet.

\* \* \* \* \*